US011578221B2

(12) United States Patent
Steeman et al.

(10) Patent No.: US 11,578,221 B2
(45) Date of Patent: Feb. 14, 2023

(54) COMPOSITIONS AND METHODS FOR HIGH-TEMPERATURE JETTING OF VISCOUS THERMOSETS TO CREATE SOLID ARTICLES VIA ADDITIVE FABRICATION

(71) Applicant: Covestro (Netherlands) B.V., Nieuwegein (NL)

(72) Inventors: Paulus Antonius Maria Steeman, Echt (NL); Adrianus Cornelis Bastiaan Bogaerds, Echt (NL); Marco Marcus Matheus Driessen, Echt (NL); Rudolfus Antonius Theodorus Maria Van Benthem, Echt (NL); Robbert Van Sluijs, Echt (NL); Franciscus Johannes Marie Derks, Echt (NL)

(73) Assignee: Covestro (Netherlands) B.V., Geleen (NL)

( * ) Notice: Subject to any disclaimer, the term of this patent is extended or adjusted under 35 U.S.C. 154(b) by 308 days.

(21) Appl. No.: 16/771,263

(22) PCT Filed: Dec. 14, 2018

(86) PCT No.: PCT/NL2018/050841
§ 371 (c)(1),
(2) Date: Jun. 10, 2020

(87) PCT Pub. No.: WO2019/117723
PCT Pub. Date: Jun. 20, 2019

(65) Prior Publication Data
US 2020/0369896 A1 Nov. 26, 2020

Related U.S. Application Data

(60) Provisional application No. 62/610,303, filed on Dec. 26, 2017, provisional application No. 62/599,245, filed on Dec. 15, 2017.

(51) Int. Cl.
| | | |
|---|---|---|
| *B29C 35/08* | (2006.01) | |
| *C08F 2/46* | (2006.01) | |
| *C08F 2/50* | (2006.01) | |
| *C08G 61/04* | (2006.01) | |
| *C09D 11/101* | (2014.01) | |
| *B33Y 10/00* | (2015.01) | |
| *B29C 64/112* | (2017.01) | |
| *B29C 64/209* | (2017.01) | |
| *B33Y 70/10* | (2020.01) | |
| *C09D 11/38* | (2014.01) | |
| *B29K 33/04* | (2006.01) | |
| *B29K 105/00* | (2006.01) | |
| *B29K 105/16* | (2006.01) | |
| *B29K 509/08* | (2006.01) | |
| *C08K 3/36* | (2006.01) | |

(52) U.S. Cl.
CPC .......... *C09D 11/101* (2013.01); *B29C 64/112* (2017.08); *B29C 64/209* (2017.08); *B33Y 10/00* (2014.12); *B33Y 70/10* (2020.01); *C09D 11/38* (2013.01); *B29K 2033/04* (2013.01); *B29K 2105/0094* (2013.01); *B29K 2105/162* (2013.01); *B29K 2509/08* (2013.01); *C08K 3/36* (2013.01); *C08K 2201/011* (2013.01); *C08K 2201/014* (2013.01)

(58) Field of Classification Search
CPC ....... C09D 11/101; C09D 11/38; C09D 11/30; B33Y 70/00; B33Y 10/00; B33Y 80/00; C08K 2201/014; C08K 2201/011; C08K 3/36; B29C 64/209; B29C 64/112; B29C 64/124; B29K 2105/0094; B29K 2105/162; B29K 2509/08; B29K 2033/04
USPC .......... 264/494, 405; 522/71, 189, 184, 6, 1; 520/1
See application file for complete search history.

(56) References Cited

U.S. PATENT DOCUMENTS

| | | |
|---|---|---|
| 5,705,316 A | 1/1998 | Steinmann |
| 5,889,084 A | 3/1999 | Roth |
| 7,183,040 B2 | 2/2007 | Thies |
| 7,381,360 B2 | 6/2008 | Oriakhi |
| 7,479,510 B2 | 1/2009 | Napadensky |
| 8,569,398 B2 | 10/2013 | Patel |
| 9,156,049 B2 | 10/2015 | Galluzzo |

(Continued)

FOREIGN PATENT DOCUMENTS

| | | |
|---|---|---|
| EP | 2298540 B1 | 8/2013 |
| EP | 2774954 A1 | 9/2014 |

(Continued)

OTHER PUBLICATIONS

International Search Report dated Apr. 11, 2019.
(Continued)

*Primary Examiner* — Jessica Whiteley
(74) *Attorney, Agent, or Firm* — Jed C. Benson

(57) ABSTRACT

Described herein are methods and compositions for forming three-dimensional objects via material jetting processes, the methods including the repeated steps of selectively depositing a liquid thermoset material onto a surface from a nozzle of at least one jetting head in a first specified direction and exposing at least a portion of the liquid thermoset material to a source of actinic radiation in order to form a three-dimensional object from the cured thermoset material, wherein the jetting head is configured to eject droplets of the liquid thermoset material from the nozzle at prescribed elevated operating temperatures, and wherein the liquid thermoset material is chosen so as to possessing prescribed viscosity and rheological characteristics.

20 Claims, 4 Drawing Sheets

(56) References Cited

U.S. PATENT DOCUMENTS

| | | |
|---|---|---|
| 9,334,402 B2 | 5/2016 | Napadensky |
| 9,708,442 B1 | 7/2017 | Kwisnek |
| 2002/0008333 A1 | 1/2002 | Napadensky |
| 2003/0032692 A1 | 2/2003 | Mejiritski |
| 2010/0039480 A1 | 2/2010 | Brown |
| 2010/0068407 A1 | 3/2010 | Jeremic |
| 2010/0327493 A1* | 12/2010 | Fong .................. G03F 7/038 264/401 |
| 2011/0219973 A1 | 9/2011 | Gullentops |
| 2015/0353750 A1 | 12/2015 | Titterington |
| 2017/0306171 A1 | 10/2017 | Vidavsky |

FOREIGN PATENT DOCUMENTS

| | | |
|---|---|---|
| EP | 2868692 B1 | 10/2017 |
| JP | 2001220526 A | 8/2001 |
| JP | 2002317139 A | 10/2002 |
| JP | 2016112824 A | 6/2016 |
| WO | WO9310910 A1 | 6/1993 |
| WO | WO2004096514 A3 | 7/2005 |
| WO | WO2005053928 A3 | 8/2005 |
| WO | WO2017064473 A1 | 4/2017 |

OTHER PUBLICATIONS

Written Opinion dated Jun. 20, 2019.

Jian, Guo et al., Effect of Fluid Viscoelasticity on the Droplet Parameters of Inkjet Printing, pp. 118-123, Packaging Engineering, Aug. 2014.

Daoshan, Li et al., Rheologic Behavior of Aqueous Polymer Solution in Extension as Influenced by Water Quality, pp. 296-299, Oilfield Chemistry, Sep. 2009.

\* cited by examiner

COMPOSITIONS AND METHODS FOR HIGH-TEMPERATURE JETTING OF VISCOUS THERMOSETS TO CREATE SOLID ARTICLES VIA ADDITIVE FABRICATION

CROSS-REFERENCE TO RELATED APPLICATIONS

This application is a U.S. national phase entry under 35 USC § 371 of international application PCT/NL2018/050841, filed 14 Dec. 2018, which designated the U.S. and claims priority to U.S. Provisional Applications 62/610,303, filed 26 Dec. 2017, and U.S. Provisional Application 62/599,245, filed 15 Dec. 2017, the entire contents of each of which is hereby incorporated by reference in its entirety.

CROSS-REFERENCE TO RELATED APPLICATIONS

This application claims priority to U.S. Provisional Application No. 62/599245, filed 15 Dec. 2017, and U.S. Provisional Application No. 62/610303, filed 26 Dec. 2017, the entire contents of each of which are hereby incorporated by reference in their entirety as if fully set forth herein.

TECHNICAL FIELD

The present invention relates to methods and compositions for forming three-dimensional articles via additive fabrication jetting processes using viscous thermosetting compositions, and the three-dimensional articles created therefrom.

BACKGROUND

Additive fabrication processes for producing three dimensional objects are well known. Additive fabrication processes utilize computer data of an object to build up three-dimensional objects in a layer-wise or portion-wise fashion from various materials which may take the form of liquid resins, solid powders, melted filaments, or pastes/slurries. Also known as additive manufacturing or 3D printing, seven such non-limiting additive fabrication techniques are currently defined under ISO/ASTM52900-15, including: binder jetting, directed energy deposition, material extrusion, material jetting, powder bed fusion, sheet lamination and vat photopolymerization.

Material jetting is a well-known, non-limiting form of additive manufacturing that has recently increased in commercial popularity. Material jetting for additive fabrication involves the selective ejection of one or more materials from a prescribed number of jet heads. In such processes, liquid droplets of the material to be deposited are quickly and successively transferred onto a surface in a predefined pattern. In material jetting additive fabrication processes, the deposition process is repeated until a three-dimensional object is formed. In material jetting additive fabrication processes, the surface onto which materials are jetted may include, without limitation, a rigid build platform, a flexible foil, a previously solidified portion of jetted material, or a powder bed of a different material.

A wide array of different materials may be employed in additive fabrication processes. Thermoplastic materials are commonly used in sheet lamination and material extrusion processes, such as fused filament fabrication (FFF). Thermoplastics are also commonly used in directed energy deposition processes such as selective laser sintering (SLS), although metals and other inorganic materials may be used in SLS processes as well. Vat photopolymerization techniques such as stereolithography typically employ a single liquid thermoset material from which the three-dimensional articles are cured.

Material jetting processes are advantageous because they enable the simultaneous use of a plurality of different materials or material types in the same build process. For example, jetting print heads in an additive fabrication process may dispense waxes or thermoplastic materials which solidify upon cooling after selective deposition on the surface to be covered. Such materials are often used as a scaffolding material to provide support for the desired object to be formed, in order to prevent deformation during the build process. Other jetting print heads, on the other hand, may be designed to eject photopolymers that respond to the application of actinic radiation to form irreversible thermoset bonds at prescribed wavelengths and/or intensities.

Electromagnetic radiation is used to encourage rapid curing of the thermosetting materials. The radiation may be emitted in the UV, visible, UV/vis, or infrared portions of the electromagnetic spectrum and may be applied, for example, by lasers, lamps, or LEDs. The electromagnetic, or actinic, radiation may be applied selectively, e.g. by drawing a specific pattern with a laser, using a digital micromirror device (DMD), or a mask, or unselectively, e.g. by passing a lamp over the entirety of a surface. Post-processing by applying additional temperature or light to the newly formed three-dimensional object may be necessary to achieve the desired properties of a three-dimensional object formed from a thermosetting composition.

Thermoset materials designed for additive fabrication processes are well-known generally. Low viscosity, typically low-molecular weight radically-polymerizable resins are known to exist in material jetting additive fabrication processes. Such resins generally consist of one or more (meth)acrylate compounds (or other free-radical polymerizable organic compounds) along with a free-radical photoinitiator for radical generation. U.S. Pat. No. 5,418,112 describes one such radical-curable system. Although such radically-polymerizable resins typically possess low viscosities and will readily cure under even relatively lower energy and/or intensity, they are not always capable of producing solid objects which are sufficient for many end-use applications. First, several (meth)acrylate-based resins considered suitable for material jetting additive fabrication processes have traditionally produced cured parts that are overly brittle or possess other undesirable mechanical properties. Therefore, they may produce parts which are typically not robust enough for non-prototyping applications. Also, such resins may exhibit problems of deformation, such as production of warped or malformed parts, because of residual strain due to the differential shrinkage during curing. Such problems are exacerbated on larger-platform additive fabrication machines, wherein the cumulative differential shrinkage effect amplifies part warping or malformation as cured objects become larger. These problems of deformation can be partially rectified through software which accounts for known shrinkage rates by modifying the CAD file from which a solid three-dimensional part is generated. However, software corrections are insufficient to completely compensate for deformation in parts which have intricate and complicated shapes or require a strict dimensional tolerance across longer distances.

Another well-known type of thermoset material suitable for use in additive fabrication systems is a "hybrid" curable resin, or one that comprises: (1) epoxies, oxetanes, or other types of cationically polymerizable compounds; (2) one or more cationic photoinitiators; (3) acrylate resins or other types of free radical polymerizable compounds; and (4) one or more free radical photoinitiators. Examples of such hybrid curable systems are described in, for example, U.S. Pat. No. 5,434,196. Such materials have long-been known to afford the creation of cured parts produced via additive fabrication processes that may possess superior mechanical properties relative to low molecular weight all-acrylate based systems. Furthermore, hybrid curable systems are considered superior to all-acrylate systems in that they suffer less from the differential shrinkage problems which have long-plagued all-acrylate systems.

Various hybrid curable photopolymer compositions for additive fabrication processes are further described in, e.g. U.S. Pat. No. 7,183,040. Such compositions, which are particularly optimized for stereolithography processes, include prescribed amounts of a cationically curable component having a linking aliphatic ester group, an additional epoxy-group containing component, an oxetane-containing component, a multifunctional acrylate, a free-radical photoinitiator, and a cationic photoinitiator. The components formed therefrom possess a desirable combination of stiffness, toughness, heat resistance, and resistance to water absorption.

Yet additional thermosets capable of producing three-dimensional parts with exceptional toughness are described in U.S. Pat. No. 9,676,899. Therein, radiation curable resin compositions are disclosed which comprise cationically polymerizable components and various species of impact modifiers that impart high tensile modulus and high toughness into the parts cured therefrom, as measured by high impact strength and/or high resistance against crack propagation.

Even further thermosets capable of producing three-dimensional parts with exceptional degrees of stiffness and heat resistance are described in U.S. Pat. No. 9,228,073. Therein, compositions are disclosed and claimed which utilize a prescribed matrix of filler particles to facilitate the achievement of such desirable properties into resins containing cationically curable and free-radically curable constituents.

Thermosets capable of producing three-dimensional parts from hybrid-curable photopolymer compositions in additive fabrication processes employing radiation sources operating in the UV/vis region of the electromagnetic spectrum are described and claimed in U.S. Pat. No. 9,708,442. Such compositions possess a photoinitiating package including Norrish Type I photoinitiators with prescribed ionization potentials, a compound possessing an electron-donating substituent attached to a vinyl group, a cationically curable constituent, a cationic photoinitiator, and a free-radically curable component.

Compositions described in the above thermoset compositions yield excellent properties in the cured objects they create, but the chemistry required to do so often results in highly viscous liquid compositions. In some cases, the compositions prescribed possess a viscosity at 25° C. of up to and well-above 1000 centipoise (cPs).

Purported advancements enabling the use of materials with slightly elevated viscosities (in relation to the low-viscosity traditional "inks") in contemporary material jetting additive fabrication processes are described in, inter alia, US2002/008333 and US2010/0092691. These references note that jet deposition may occur at elevated temperatures, in turn enabling the materials employed to possess viscosities ranging from 50-500 cPs at 25° Celsius. However, tradeoffs are still required: the references teach that, in order to function properly in the jetting process, such compositions must still possess extremely low viscosities (such as below 20 cPs) at the printing temperature. The references concede that the initial viscosity of many curable compositions that can provide desirable final properties make them difficult to jet.

Despite the foregoing, the amount of materials actually suitable for use with known material jetting systems for additive fabrication systems remains extremely limited. Specifically, there is an unmet need for material jetting systems and processes which utilize a broader array of highly viscous thermoset materials that are capable of yielding three-dimensional articles with superior mechanical properties.

BRIEF SUMMARY

Described herein are several embodiments of the invention which solve this unmet need. A first embodiment is a method for forming a three-dimensional object comprising the steps of selectively depositing a liquid thermoset material onto a surface from a nozzle of at least one jetting head of a print system in a first jetting direction in accordance with a predetermined pattern, exposing at least a portion of the liquid thermoset material to a source of actinic radiation to form a portion of a cured thermoset material, and repeating the selectively depositing and exposing steps a plurality of times in order to form a three-dimensional object from the cured thermoset material, wherein the jetting head is configured to eject droplets of the liquid thermoset material from the nozzle at an operating temperature of up to about 180° C., or from about 30° C. to about 160° C., or from about 40° C. to about 150° C., or from about 45° C. to about 140° C., or from about 50° C. to about 135° C., or from about 65° C. to about 130° C., further wherein the liquid thermoset material possesses, at the operating temperature, a viscosity of up to about 60 cPs, or from about 2 cPs to about 60 cPs, or from about 5 cPs to 55 about cPs, or from about 8 cPs to about 50 cPs, or from about 10 cPs to about 50 cPs, or from greater than 20 cPs to about 60 cPs, or from greater than 30 cPs to about 60 cPs;
wherein the liquid thermoset material, when tested by the CaBER extensional rheology method, satisfies the following equation:

$$\frac{t_{break} - t_{viscous}}{t_{viscous}} < X$$

wherein $t_{break}$ is the actual break-up time and $t_{viscous}$ is the viscous break-up time, and X is less than 1, or less than 0.8, or less than 0.7, preferably less than 0.5, or less than 0.4, or less than 0.3, or less than 0.2, or less than 0.1, or about 0.0.

A second embodiment is the three-dimensional article formed via the method according to the first embodiment using the composition according to the first embodiment. Further embodiments of the invention are described below.

DETAILED DESCRIPTION

Figure 1:
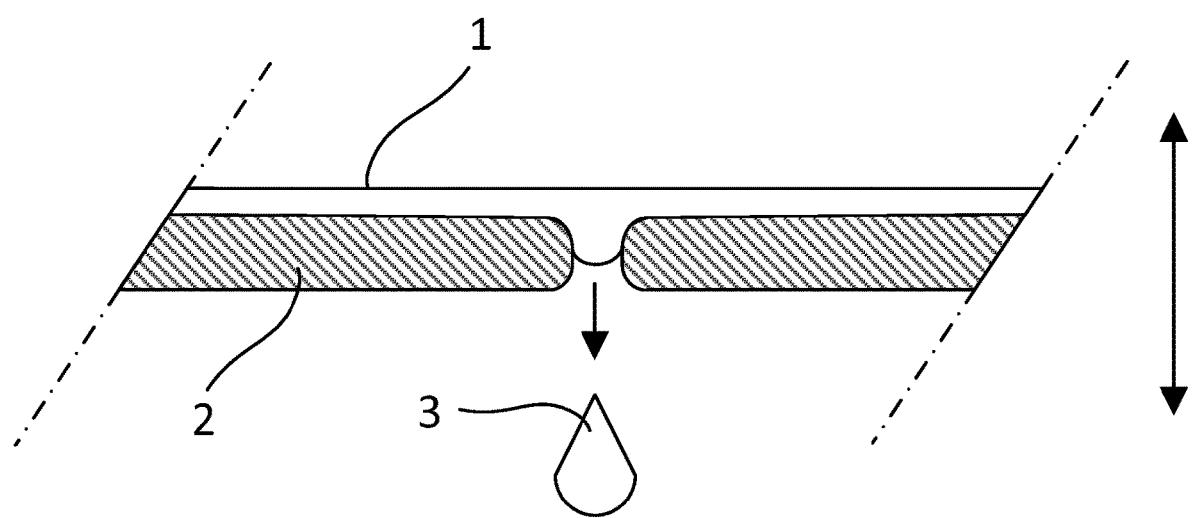
FIG. 1 depicts a cross-section of the nozzle plates and nozzle of a jetting head used in various embodiments of the current invention.

Methods according to a first embodiment of the invention include the steps of selectively depositing a liquid thermoset material onto a surface from a nozzle of at least one jetting head of a print system in a first jetting direction in accordance with a predetermined pattern, exposing at least a portion of the liquid thermoset material to a source of actinic radiation to form a portion of a cured thermoset material, and repeating the selectively depositing and exposing steps a plurality of times in order to form a three-dimensional object from the cured thermoset material, wherein the jetting head is configured to eject droplets of the liquid thermoset material from the nozzle at an operating temperature of up to about 180° C., or from about 30° C. to about 160° C., or from about 40° C. to about 150° C., or from about 45° C. to about 140° C., or from about 50° C. to about 135° C., or from about 65° C. to about 130° C., further wherein the liquid thermoset material possesses, at the operating temperature, a viscosity of up to about 60 cPs, or from about 2 cPs to about 60 cPs, or from about 5 cPs to 55 about cPs, or from about 8 cPs to about 50 cPs, or from about 10 cPs to about 50 cPs, or from greater than 20 cPs to about 60 cPs, or from greater than 30 cPs to about 60 cPs;
wherein the liquid thermoset material, when tested by the CaBER extensional rheology method, satisfies the following equation:

$$\frac{t_{break} - t_{viscous}}{t_{viscous}} < X$$

wherein $t_{break}$ is the actual break-up time and $t_{viscous}$ is the viscous break-up time, and X is less than 1, or less than 0.8, or less than 0.7, preferably less than 0.5, or less than 0.4, or less than 0.3, or less than 0.2, or less than 0.1, or about 0.0.

In an embodiment, material jetting processes according to the present invention involve the selective deposition of liquid thermoset material onto a surface from a nozzle of at least one jetting head of a print system in a first jetting direction in accordance with a predetermined pattern according to methods well-known in the art. Jetted materials are deposited from the nozzle of the jet head by means of several types of actuators. One such type, which has traditionally incorporated so-called bubblejet technology, utilizes electromechanical actuating means. Actuation may also be accomplished via piezoelectric and/or electrorestrictive means as well. Such methods and apparatuses incorporating electroacoustic and magnetoacoustic actuators are described in WO1993010910.

In an embodiment, material jetting processes according to the present invention additionally involve exposing at least a portion of the liquid thermoset material to a source of actinic radiation sufficient to form a portion of a cured thermoset material. Exposure as meant herein means irradiating with actinic radiation. Exposure or irradiation may occur at any suitable time in relation to the deposition, but it is preferable that the dose of radiation sufficient to impart full curing of the liquid thermoset be performed after the droplet has reached its intended destination on the surface. Full curing prior to deposition would result in an inability for successive droplets or layers of the three-dimensional part to possess sufficient adhesive or cohesive forces to enable the production of a single, solid article with desired mechanical properties. Similarly, it is preferable that the exposure of electromagnetic radiation does not occur too late after the material has been deposited, as the droplet may move from its original intended destination, or the material might change certain characteristics if exposed to ambient conditions for too long.

The source of actinic radiation, or light source, may be one or more of the any of the sources described elsewhere herein. In various embodiments, the radiation may be emitted in the UV, visible, UV/vis, or infrared portions of the electromagnetic spectrum, but a light source should be chosen so as to match its emission spectra with the optimal absorbance ranges of the liquid thermoset being utilized.

The light source can be disposed in any suitable location relative to the surface. In an embodiment, the source of actinic radiation affixed in a location parallel to and above the build surface, such that ejected droplets travel orthogonally to, and away from, the source of actinic radiation. However, in other embodiments, the light source may be located below the light source, particularly if the material jetting process builds a part upside down. In such case, the light source may be disposed below a transparent film onto which the most recently deposited layer of material has been deposited. In still other embodiments, the light source could be disposed in other locations, or even be moveable so as to travel along the surface to be cured.

In an embodiment, the previous steps are repeated a number of times in order to build up the three-dimensional article to be created. The build time and number of repetitions depends upon the droplet size, the magnitude and geometry of the article to be created, the desired part feature detail and accuracy, the quantum of energy required to fully cure the liquid thermoset, and the speed of the material jetting system.

Although most known material jetting systems for use in additive fabrication processes incorporating thermoset materials are capable of performing a repeated sequence of selective deposition and curing in some fashion, there remains a need for systems and methods of jetting that enable the use of an expanded library of materials, and in particular highly viscous thermosets which are capable of producing three-dimensional articles with superior properties. In particular therefore, as a minimum prerequisite, such jetting systems must be configured to both: (1) be operable at elevated temperatures and simultaneously (2) eject materials possessing elevated viscosities at said elevated temperatures.

In various embodiments, therefore, the jetting head is configured to eject droplets of a liquid thermoset material from a nozzle at an elevated operating temperature of up to about 180° C., or from about 30° C. to about 160° C., or from about 40° C. to about 150° C., or from about 45° C. to about 140° C., or from about 50° C. to about 135° C., or from about 65° C. to about 130° C., or from greater than 80° C. to about 140° C., or from greater than 80° C. to about 130° C.

Similarly, in various embodiments, the jetting head must also be configured to eject viscous droplets of the liquid thermoset material from the nozzle at such elevated temperatures. Accordingly in various embodiments, at the elevated operating temperature, the jetting head is configured to successfully eject droplets of liquid thermoset materials possessing a viscosity of up to about 60 cPs, or from about 2 cPs to about 60 cPs, or from about 5 cPs to 55 about cPs, or from about 8 cPs to about 50 cPs, or from about 10 cPs to about 50 cPs, or from greater than 20 cPs to about 60 cPs, or from greater than 30 cPs to about 60 cPs.

In an embodiment, the method involves the use of a material jetting system that is capable of dispensing droplets at temperatures of up to 150 degrees Celsius at a maximum viscosity of up to 50 cPs. In another embodiment, the method involves the use of a material jetting system that is capable of ejecting droplets with fillers possessing a size of up to 50 micrometers.

Figure 2:
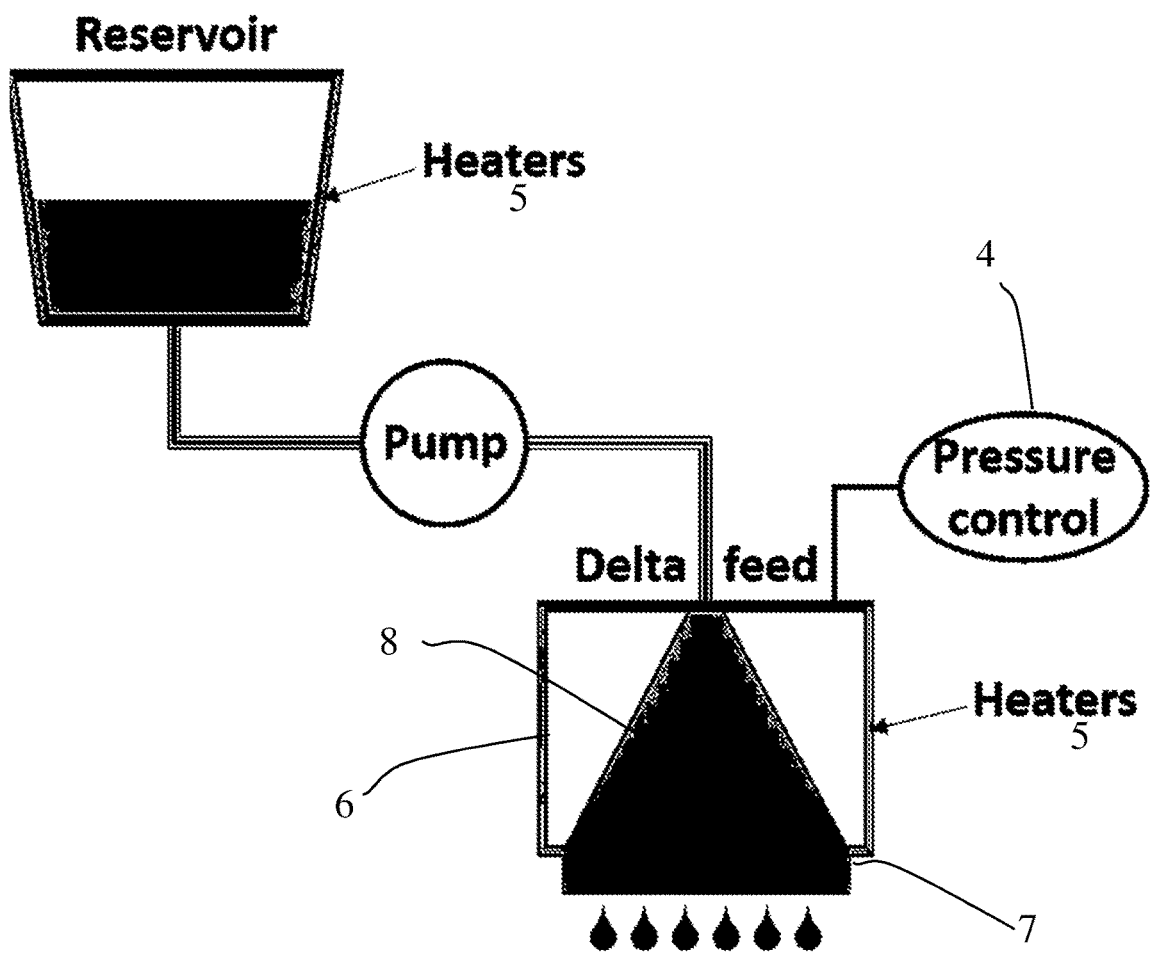
FIG. 2 depicts a cross-section of a non-limiting example of a jetting head of a print system as used in embodiments of the current invention.

A non-limiting example of a material jetting system that is capable of satisfying the above temperature and high-viscosity jetting requirements is shown in FIGS. 1 and 2. Turning to FIG. 1, a cross-section of a single jettable material 1 is disposed upon nozzle plate 2. The jettable material may be any sufficiently jettable substance, but is preferably a viscous thermoset material, such as the types described elsewhere herein. The nozzle plate 2 is made from nickel, although other suitable substances may be used. Jettable droplets 3 are formed and ejected by virtue of the actuated motion in the XY-plane of the nozzle plate 2. Such nozzle plates may be actuated by any means, but in a preferred embodiment the actuation is accomplished by means of piezo fingers (not shown) constructed of lead zirconium titanate. The depiction of the single nozzle in FIG. 1 may be incorporated into an array of similarly-structured nozzles, with baffles (not shown) at least partially separating the channels between successive nozzle plates. In such an embodiment, the partial separation of the successive nozzle plates facilitates a so-called open construction, which further enables for open fluid circulation between successive nozzles.

Turning to FIG. 2, a jettable material reservoir module is shown. In this embodiment, the reservoir module is disposed above the nozzle plates 7, and allows for the storage, fluid circulation, and heating of the jettable material 1. Accordingly, a jettable material or plurality of materials are confined within a U-shaped reservoir channel 8. The reservoir module comprises an insulated housing 6 substantially encasing the reservoir channel, further within which a heating element 5 is disposed in order to maintain a sufficiently low viscosity for the jettable material 1 just before—and during—jetting operation. Heating elements 4 may be disposed on both sides of the reservoir channel 8 to selectively heat one or both sides of the material in the reservoir channel 8. The heating element or elements 5 are regulated by a standard temperature controller by known means A pressure controller 4 is also operably connected to the reservoir module to regulate pressure in one or both sides of the U-shaped reservoir channel 8 if desired. Upon actuation of the nozzle plates 7 per the methods described in relation to FIG. 1, the jettable material 1 is again ejected in droplet form, potentially at high temperatures and/or viscosities.

A non-limiting example of a known material jetting system for additive fabrication processes which is suitable for use in the processes described and claimed herein is the Vista array print head jetting system developed by the Technology Partnership plc, Melbourn, England.

Indeed, Inventors have discovered that certain highly viscous liquid thermoset materials are suitable for use in additive fabrication processes incorporating jetting heads operating at—and capable of dispensing material at—elevated temperatures, including those materials which remain viscous (i.e. greater than 20 cPs or 30 cPs) even after heating to the maximum temperatures currently attainable on known jetting systems (or to the maximum temperatures the liquid thermoset materials themselves can withstand before degrading). However, Inventors have surprisingly discovered that highly viscous liquid thermoset materials are compatible in such material jetting systems only if formulated or selected to possess certain rheology characteristics, as will be described in further detail elsewhere herein.

The liquid thermoset materials used in the methods according to the present invention possess at least one initiator and one or more polymerizable compounds. The initiator and polymerizable compound(s) may be jetted simultaneously from the same fluid reservoir or nozzle, but they may also be jetted separately from two or more independent jetting heads such that they mix or combine only at the location at which curing is desired. Such a multiple jetting-head approach is particularly desirable in otherwise unstable compositions wherein the initiator and polymerizable components are likely to react in the jetting head or reservoir prematurely. This can occur due to, e.g., chemical reactions between the components which cause the composition to slowly polymerize over time, or because undesired initiation begins to occur at the elevated temperatures at which the jetting heads of the present invention are intended to operate.

In an embodiment, the liquid thermoset material comprises a first network-forming component with at least one free-radically polymerizable compound, that is, a compound which undergoes polymerization initiated by free radicals. The free-radical polymerizable compounds are monomers, oligomers, and/or polymers; they are monofunctional or polyfunctional materials, i.e., have 1, 2, 3, 4, 5, 6, 7, 8, 9, 10 . . . 20 . . . 30 . . . 40 . . . 50 . . . 100, or more functional groups that can polymerize by free radical initiation, may contain aliphatic, aromatic, cycloaliphatic, arylaliphatic, heterocyclic moiety(ies), or any combination thereof. Examples of polyfunctional materials include dendritic polymers such as dendrimers, linear dendritic polymers, dendrigraft polymers, hyperbranched polymers, star branched polymers, and hypergraft polymers; see, e.g., US 2009/0093564 A1. The dendritic polymers may contain one type of polymerizable functional group or different types of polymerizable functional groups, for example, acrylates and methacrylate functions.

Examples of free-radical polymerizable components include acrylates and methacrylates such as isobornyl (meth) acrylate, bornyl (meth)acrylate, tricyclodecanyl (meth)acrylate, dicyclopentanyl (meth)acrylate, dicyclopentenyl (meth)acrylate, cyclohexyl (meth)acrylate, benzyl (meth) acrylate, 4-butylcyclohexyl (meth)acrylate, acryloyl morpholine, (meth)acrylic acid, 2-hydroxyethyl (meth)acrylate, 2-hydroxypropyl (meth)acrylate, 2-hydroxybutyl (meth) acrylate, methyl (meth)acrylate, ethyl (meth)acrylate, propyl (meth)acrylate, isopropyl (meth)acrylate, butyl (meth)acrylate, amyl (meth)acrylate, isobutyl (meth) acrylate, t-butyl (meth)acrylate, pentyl (meth)acrylate, caprolactone acrylate, isoamyl (meth)acrylate, hexyl (meth)acrylate, heptyl (meth) acrylate, octyl (meth)acrylate, isooctyl (meth)acrylate, 2-ethylhexyl (meth)acrylate, nonyl (meth)acrylate, decyl (meth)acrylate, isodecyl (meth)acrylate, tridecyl (meth)acrylate, undecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, benzyl (meth)acrylate, phenoxyethyl (meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, diacetone (meth)acrylamide, beta-carboxyethyl (meth)acrylate, phthalic acid (meth)acrylate, dimethylaminoethyl (meth)acrylate, diethylaminoethyl (meth)acrylate, butylcarbamylethyl (meth)acrylate, n-isopropyl (meth)acrylamide fluorinated (meth)acrylate, 7-amino-3,7-dimethyloctyl (meth)acrylate.

Examples of polyfunctional free-radical polymerizable components include those with (meth)acryloyl groups such as trimethylolpropane tri(meth)acrylate, pentaerythritol (meth)acrylate, ethylene glycol di(meth)acrylate, bisphenol A diglycidyl ether di(meth)acrylate, dicyclopentadiene dimethanol di(meth)acrylate, [2-[1,1-dimethyl-2-[(1-oxoallyl)oxy]ethyl]-5-ethyl-1,3-dioxan-5-yl]methyl acrylate; 3,9-bis(1,1-dimethyl-2-hydroxyethyl)-2,4,8,10-tetraoxaspiro [5.5]undecane di(meth)acrylate; dipentaerythritol monohydroxypenta(meth)acrylate, propoxylated trimethylolpropane tri(meth)acrylate, propoxylated neopentyl glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, polybutanediol di(meth)acrylate, tripropyleneglycol di(meth)acrylate, glycerol tri(meth)acrylate, phosphoric acid mono- and di(meth)acrylates, $C_7$-$C_{20}$ alkyl di(meth)acrylates, tris(2-hydroxyethyl)isocyanurate tri(meth)acrylate, tris(2-hydroxyethyl)isocyanurate di(meth)acrylate, pentaerythritol tri(meth)acrylate, pentaerythritol tetra(meth)acrylate, dipentaerythritol hexa(meth)acrylate, tricyclodecane diyl dimethyl di(meth)acrylate and alkoxylated versions (e.g., ethoxylated and/or propoxylated) of any of the preceding monomers, and also di(meth)acrylate of a diol which is an ethylene oxide or propylene oxide adduct to bisphenol A, di(meth)acrylate of a diol which is an ethylene oxide or propylene oxide adduct to hydrogenated bisphenol A, epoxy (meth)acrylate which is a (meth)acrylate adduct to bisphenol A of diglycidyl ether, diacrylate of polyoxyalkylated bisphenol A, and triethylene glycol divinyl ether, and adducts of hydroxyethyl acrylate.

In accordance with an embodiment, the radically polymerizable component is a polyfunctional (meth)acrylate. The polyfunctional (meth)acrylates may include all meth acryloyl groups, all acryloyl groups, or any combination of meth acryloyl and acryloyl groups. In an embodiment, the free-radical polymerizable component is selected from the group consisting of bisphenol A diglycidyl ether di(meth)acrylate, ethoxylated or propoxylated bisphenol A or bisphenol F di(meth)acrylate, dicyclopentadiene dimethanol di(meth)acrylate, [2-[1,1-dimethyl-2-[(1-oxoallyl)oxy]ethyl]-5-ethyl-1,3-dioxan-5-yl]methyl acrylate, dipentaerythritol monohydroxypenta(meth)acrylate, dipentaerythritol penta(meth)acrylate, dipentaerythritol hexa(meth)acrylate, propoxylated trimethylolpropane tri(meth)acrylate, and propoxylated neopentyl glycol di(meth)acrylate, and any combination thereof.

In an embodiment, the polyfunctional (meth)acrylate has more than 2 functional groups. According to another embodiment, the polyfunctional (meth)acrylate has more than 3 functional groups. In yet another embodiment, the polyfunctional (meth)acrylate has more than 4 functional groups. In another preferred embodiment, the radically polymerizable component consists exclusively of a single polyfunctional (meth)acrylate component. In further embodiments, the exclusive radically polymerizable component is tetra-functional, in further embodiments, the exclusive radically polymerizable component is penta-functional, and in further embodiments, the exclusive radically polymerizable component is hexa-functional.

In another embodiment, the free-radical polymerizable component contains an aromatic (meth)acrylate. Aromatic acrylates may be derived from, as non-limiting examples, bisphenol-A, bisphenol-S, or bisphenol-F. In certain embodiments the aromatic selected from the group consisting of bisphenol A diglycidyl ether diacrylate, dicyclopentadiene dimethanol diacrylate, [2[1,1dimethyl-2[(1-oxoallyl)oxy]ethyl]-5-ethyl-1,3-dioxan-5-yl]methyl acrylate, dipentaerythritol monohydroxypentaacrylate, propoxylated trimethylolpropane triacrylate, and propoxylated neopentyl glycol diacrylate, and any combination thereof. In an embodiment, the aromatic (meth)acrylate is difunctional.

In specific embodiments, the liquid radiation curable resins for additive fabrication of the invention include one or more of bisphenol A diglycidyl ether di(meth)acrylate, dicyclopentadiene dimethanol di(meth)acrylate, dipentaerythritol monohydroxypenta(meth)acrylate, propoxylated trimethylolpropane tri(meth)acrylate, and/or propoxylated neopentyl glycol di(meth)acrylate, and more specifically one or more of bisphenol A diglycidyl ether diacrylate, dicyclopentadiene dimethanol diacrylate, dipentaerythritol pentaacrylate, propoxylated trimethylolpropane triacrylate, and/or propoxylated neopentyl glycol diacrylate.

The first network forming component can contain the above-mentioned radically polymerizable compounds either singly or in any combination of two or more thereof. The liquid thermoset material can include any suitable amount of the first network forming component, for example, in certain embodiments, in an amount up to about 50 wt. % of the liquid thermoset material, in certain embodiments, from about 2 to about 40 wt. % of the liquid thermoset material, in other embodiments from about 5 to about 30 wt. %, and in further embodiments from about 10 to about 20 wt. % of the liquid thermoset material. In preferred embodiments, the first network forming component is present in an amount, relative to the weight of the total liquid thermoset material jetted from a particular jetting head or nozzle, of from about 5 wt. % to about 80 wt. %, or from about 5 wt. % to about 40 wt. %. Of course, if the initiators are jetted separately from the polymerizable compounds, the weight percentage of the first network forming component in the reservoir or jetting head into which polymerizable compounds are contained can be much higher, and even up to 100 wt. %.

In various embodiments, the liquid thermoset material may further comprise a second network-forming component with at least one cationically polymerizable compound; that is a component which undergoes polymerization initiated by cations or in the presence of acid generators. The cationically polymerizable compounds may be monomers, oligomers, and/or polymers, and may contain aliphatic, aromatic, cycloaliphatic, arylaliphatic, heterocyclic moiety(ies), and any combination thereof. In an embodiment, the cationically polymerizable compound includes at least one cycloaliphatic compound. Suitable cyclic ether compounds can comprise cyclic ether groups as side groups or groups that form part of an alicyclic or heterocyclic ring system.

The cationic polymerizable compound may be selected from one or more of the group consisting of cyclic ether compounds, cyclic acetal compounds, cyclic thioethers compounds, spiro-orthoester compounds, cyclic lactone compounds, and vinyl ether compounds, and any combination thereof.

Suitable cationically polymerizable compounds include cyclic ether compounds such as epoxy compounds and oxetanes, cyclic lactone compounds, cyclic acetal compounds, cyclic thioether compounds, and spiro-orthoester compounds. Specific examples of cationically polymerizable components include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resins, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexanecarboxylate, 2-(3,4-epoxycyclohexyl-5,5-spiro-3,4-epoxy)-cyclohexane-1,4-dioxane, bis(3,4-epoxycydohexylmethyl)adipate, vinylcyclohexene oxide, 4-vinylepoxycyclohexane, vinylcyclohexene dioxide, limonene oxide, limonene dioxide, bis(3,4-epoxy-6-methylcyclohexylmethyl)adipate, 3,4-epoxy-6-methylcyclohexyl-ε-caprolactone-modified 3,4-epoxycyclohexylmethyl-3',4'-epoxycyclohexane carboxylates, trimethylcaprolactone-modified 3,4-epoxycyclohexylmethyl-3',4'-epoxycyclohexane carboxylates, β-methyl-δ-valerolactone-modified 3,4-epoxycyclohexcylmethyl-3',4'-epoxycyclohexane carboxylates, methylene bis(3,4-epoxycyclohexane), bicyclohexyl-3,3'-epoxide, bis(3,4-epoxycyclohexyl) with a linkage of —O—, —S—, —SO—, —SO$_2$—, —C(CH$_3$)$_2$—, —CBr$_2$—, —C(CBr$_3$)$_2$—, —C(CF$_3$)$_2$—, —C(CCl$_3$)$_2$—, or —CH(C$_6$H$_5$)—, dicyclopentadiene diepoxide, di(3,4-epoxycyclohexylmethyl) ether of ethylene glycol, ethylene bis(3,4-epoxycyclohexanecarboxylate), epoxyhexahydrodioctylphthalate, epoxyhexahydro-di-2-ethylhexyl phthalate, 1,4-butanediol diglycidyl ether, 1,6-hexanediol diglycidyl ether, neopentyl glycol diglycidyl ether, glycerol triglycidyl ether, trimethylolpropane triglycidyl ether, polyethylene glycol diglycidyl ether, polypropylene glycol diglycidyl ether, diglycidyl esters of aliphatic long-chain dibasic acids, monoglycidyl ethers of aliphatic higher alcohols, monoglycidyl ethers of phenol, cresol, butyl phenol, or polyether alcohols obtained by the addition of alkylene oxide to these compounds, glycidyl esters of higher fatty acids, epoxidated soybean oil, epoxybutylstearic acid, epoxyoctylstearic acid, epoxidated linseed oil, epoxidated polybutadiene, 1,4-bis[(3-ethyl-3-oxetanylmethoxy)methyl]benzene, 3-ethyl-3-hydroxymethyloxetane, 3-ethyl-3-(3-hydroxypropyl)oxymethyloxetane, 3-ethyl-3-(4-hydroxybutyl)oxymethyloxetane, 3-ethyl-3-(5-hydroxypentyl)oxymethyloxetane, 3-ethyl-3-phenoxymethyloxetane, bis((1-ethyl(3-oxetanyl))methyl)ether, 3-ethyl-3-((2-ethylhexyloxy)methyl)oxetane, 3-ethyl-((triethoxysilylpropoxymethyl)oxetane, 3-(meth)-allyloxymethyl-3-ethyloxetane, 3-hydroxymethyl-3-ethyloxetane, (3-ethyl-3-oxetanylmethoxy)methylbenzene, 4-fluoro[1-(3-ethyl-3-oxetanylmethoxy)methyl]benzene, 4-methoxy-[1-(3-ethyl-3-oxetanylmethoxy)methyl]-benzene, [1-(3-ethyl-3-oxetanylmethoxy)ethyl]phenyl ether, isobutoxymethyl(3-ethyl-3-oxetanylmethyl)ether, 2-ethylhexyl(3-ethyl-3-oxetanylmethyl)ether, ethyldiethylene glycol(3-ethyl-3-oxetanylmethyl)ether, dicyclopentadiene (3-ethyl-3-oxetanylmethyl)ether, dicyclopentenyloxyethyl (3-ethyl-3-oxetanylmethyl)ether, dicyclopentenyl(3-ethyl-3-oxetanylmethyl)ether, tetrahydrofurfuyl(3-ethyl-3-oxetanylmethyl)ether, 2-hydroxyethyl(3-ethyl-3-oxetanylmethyl) ether, 2-hydroxypropyl(3-ethyl-3-oxetanylmethyl)ether, and any combination thereof.

The cationically polymerizable component may optionally also contain polyfunctional materials including dendritic polymers such as dendrimers, linear dendritic polymers, dendrigraft polymers, hyperbranched polymers, star branched polymers, and hypergraft polymers with epoxy or oxetane functional groups. The dendritic polymers may contain one type of polymerizable functional group or different types of polymerizable functional groups, for example, epoxy and oxetane functions.

In an embodiment, the second network-forming component also comprises one or more mono or poly glycidyl ethers of aliphatic alcohols, aliphatic polyols, polyesterpolyols or polyetherpolyols. Examples of preferred components include 1,4-butanedioldiglycidylether, glycidyl ethers of polyoxyethylene and polyoxypropylene glycols and triols of molecular weights from about 200 to about 10,000 g/mol; glycidyl ethers of polytetramethylene glycol or poly(oxyethylene-oxybutylene) random or block copolymers. In a specific embodiment, the cationically polymerizable component comprises a polyfunctional glycidyl ether that lacks a cyclohexane ring in the molecule. In another specific embodiment, the second network-forming component includes a neopentyl glycol diglycidyl ether. In another specific embodiment, the second network-forming component includes a 1,4 cyclohexanedimethanol diglycidyl ether.

Examples of commercially available preferred polyfunctional glycidyl ethers are Erisys™ GE 22 (Erisys™ products are available from Emerald Performance Materials™), Heloxy™ 48, Heloxy™ 67, Heloxy™ 68, Heloxy™ 107 (Heloxy™ modifiers are available from Momentive Specialty Chemicals), and Grilonit® F713. Examples of commercially available preferred monofunctional glycidyl ethers are Heloxy™ 71, Heloxy™ 505, Heloxy™ 7, Heloxy™ 8, and Heloxy™ 61.

In an embodiment, the epoxide is 3,4-epoxycyclohexylmethyl-3',4'-epoxycyclohexanecarboxylate (available as CELLOXIDE™ 2021P from Daicel Chemical, or as CYRACURE™ UVR-6105 from Dow Chemical), hydrogenated bisphenol A-epichlorohydrin based epoxy resin (available as EPON™ 1510 from Momentive), 1,4-cyclohexanedimethanol diglycidyl ether (available as HELOXY™ 107 from Momentive), a hydrogenated bisphenol A diglycidyl ether (available as EPON™ 825 from Momentive) a mixture of dicyclohexyl diepoxide and nanosilica (available as NANOPDX™) and any combination thereof.

In another specific embodiment, the cationic polymerizable component includes an epoxy having an aromatic or aliphatic glycidyl ether group with 2 (difunctional) or more than 2 (polyfunctional) epoxy groups.

The above-mentioned cationically polymerizable compounds can be used singly or in combination of two or more thereof. In embodiments of the invention, the second network forming component further comprises at least two different epoxy components.

In other embodiments of the invention, the second network-forming component also comprises an oxetane compound. In a specific embodiment, the second network-forming component includes an oxetane, for example, an oxetane containing 1, 2 or more than 2 oxetane groups. In another embodiment, the oxetane employed is monofunctional, and additionally possesses a hydroxyl group.

The second network forming component can contain the above-mentioned cationically polymerizable compounds either singly or in any combination of two or more thereof.

The liquid thermoset material can include any suitable amount of the second network forming component, for example, in certain embodiments, in an amount up to about 50 wt. % of the liquid thermoset material, in certain embodiments, from about 2 to about 40 wt. % of the liquid thermoset material, in other embodiments from about 5 to about 30 wt. %, and in further embodiments from about 10 to about 20 wt. % of the liquid thermoset material. In preferred embodiments, the second network forming component is present in an amount, relative to the weight of the total liquid thermoset material jetted from a particular jetting head or nozzle, of from about 5 wt. % to about 80 wt. %, or from about 5 wt. % to about 40 wt. %. Of course, if the initiators are jetted separately from the polymerizable compounds, the weight percentage of the second network forming component in the reservoir into which polymerizable components are contained can be much higher, and even up to 100 wt. %.

In an embodiment, the liquid thermoset material further comprises at least one free-radical photoinitiator. A photoinitiator is a compound that chemically changes due to the action of light or the synergy between the action of light and the electronic excitation of a sensitizing dye to produce at least one of a radical, an acid, and a base.

Typically, free radical photoinitiators are divided into those that form radicals by cleavage, known as "Norrish Type I" and those that form radicals by hydrogen abstraction, known as "Norrish Type II". The Norrish Type II photoinitiators require a hydrogen donor, which serves as the free radical source.

In accordance with an embodiment, the liquid radiation curable resin for additive fabrication includes at least one free radical photoinitiator selected from the group consisting of benzoylphosphine oxides, aryl ketones, benzophenones, hydroxylated ketones, 1-hydroxyphenyl ketones, ketals, metallocenes, and any combination thereof.

In an embodiment, the liquid radiation curable resin for additive fabrication includes at least one free-radical photoinitiator selected from the group consisting of 2,4,6-trimethylbenzoyl diphenylphosphine oxide and 2,4,6-trimethylbenzoyl phenyl, ethoxy phosphine oxide, bis(2,4,6-trimethylbenzoyl)-phenylphosphineoxide, 2-methyl-1-[4-(methylthio)phenyl]-2-morpholinopropanone-1,2-benzyl-2-(dimethylamino)-1-[4-(4-morpholinyl) phenyl]-1-butanone, 2-dimethylamino-2-(4-methyl-benzyl)-1-(4-morpholin-4-yl-phenyl)-butan-1-one, 4-benzoyl-4'-methyl diphenyl sulphide, 4,4'-bis(diethylamino) benzophenone, and 4,4'-bis(N,N'-dimethylamino) benzophenone (Michler's ketone), benzophenone, 4-methyl benzophenone, 2,4,6-trimethyl benzophenone, dimethoxybenzophenone, 1-hydroxycyclohexyl phenyl ketone, phenyl(1-hydroxyisopropyl)ketone, 2-hydroxy-1-[4-(2-hydroxyethoxy) phenyl]-2-methyl-1-propanone, 4-isopropylphenyl(1-hydroxyisopropyl)ketone, oligo-[2-hydroxy-2-methyl-1-[4-(1-methylvinyl)phenyl] propanone], camphorquinone, 4,4'-bis(diethylamino) benzophenone, benzil dimethyl ketal, bis(eta 5-2-4-cyclopentadien-1-yl) bis[2,6-difluoro-3-(1H-pyrrol-1-yl) phenyl] titanium, and any combination thereof.

According to an embodiment of the present invention, the free-radical photoinitiator is of the Norrish Type I variety. According to an embodiment, the free-radical photoinitiator is an alkyl-, aryl-, or acyl-substituted compound. In an embodiment the alkyl-, aryl-, or acyl-substituted photoinitiator possesses or is centered around an atom in the Carbon (Group 14) group. In such instance, upon excitation (via absorption of radiation) the Group 14 atom present in the photoinitiator compound forms a radical. Such compound may therefore produce a radical possessing or centered upon an atom selected from the group consisting of carbon, silicon, germanium, tin, and lead. In an embodiment, the alkyl-, aryl-, or acyl-substituted photoinitiator is an acylgermanium compound. In an embodiment, the free-radical photoinitiator is an acylgermanium compound. In an embodiment, the acylgermanium is a benzoyl trimethyl germane (BTG) or bis acyl germanoyl.

For light sources emitting in the 300-475 nm wavelength range, especially those emitting at 365 nm, 390 nm, or 395 nm, examples of suitable free-radical photoinitiators absorbing in this area include: benzoylphosphine oxides, such as, for example, 2,4,6-trimethylbenzoyl diphenylphosphine oxide (Lucirin TPO from BASF) and 2,4,6-trimethylbenzoyl phenyl, ethoxy phosphine oxide (Lucirin TPO-L from BASF), bis(2,4,6-trimethylbenzoyl)-phenylphosphineoxide (Irgacure 819 or BAPO from Ciba), 2-methyl-1-[4-(methylthio)phenyl]-2-morpholinopropanone-1 (Irgacure 907 from Ciba), 2-benzyl-2-(dimethylamino)-1-[4-(4-morpholinyl) phenyl]-1-butanone (Irgacure 369 from Ciba), 2-dimethylamino-2-(4-methyl-benzyl)-1-(4-morpholin-4-yl-phenyl)-butan-1-one (Irgacure 379 from Ciba), 4-benzoyl-4'-methyl diphenyl sulphide (Chivacure BMS from Chitec), 4,4'-bis(diethylamino) benzophenone (Chivacure EMK from Chitec), and 4,4'-bis(N,N'-dimethylamino) benzophenone (Michler's ketone). Also suitable are mixtures thereof.

Additionally, photosensitizers are useful in conjunction with photoinitiators in effecting cure with LED light sources emitting in this wavelength range. Examples of suitable photosensitizers include: anthraquinones, such as 2-methylanthraquinone, 2-ethylanthraquinone, 2-tertbutylanthraquinone, 1-chloroanthraquinone, and 2-amylanthraquinone, thioxanthones and xanthones, such as isopropyl thioxanthone, 2-chlorothioxanthone, 2,4-diethylthioxanthone, and 1-chloro-4-propoxythioxanthone, methyl benzoyl formate (Darocur MBF from Ciba), methyl-2-benzoyl benzoate (Chivacure OMB from Chitec), 4-benzoyl-4'-methyl diphenyl sulphide (Chivacure BMS from Chitec), 4,4'-bis(diethylamino) benzophenone (Chivacure EMK from Chitec).

It is possible for UV radiation sources to be designed to emit light at shorter wavelengths. For light sources emitting at wavelengths from between about 100 and about 300 nm, it is possible to employ a photosensitizer with a photoinitiator. When photosensitizers, such as those previously listed are present in the formulation, other photoinitiators absorbing at shorter wavelengths can be used. Examples of such photoinitiators include: benzophenones, such as benzophenone, 4-methyl benzophenone, 2,4,6-trimethyl benzophenone, dimethoxybenzophenone, and 1-hydroxyphenyl ketones, such as 1-hydroxycyclohexyl phenyl ketone, phenyl (1-hydroxyisopropyl)ketone, 2-hydroxy-1-[4-(2-hroxyethoxy) phenyl]-2-methyl-1-propanone, and 4-isopropylphenyl(1-hydroxyisopropyl)ketone, benzil dimethyl ketal, and oligo-[2-hydroxy-2-methyl-1-[4-(1-methylvinyl)phenyl] prop anone] (Esacure KIP 150 from Lamberti).

Radiation sources can also be designed to emit at higher wavelengths. For radiation sources emitting light at wavelengths from about 475 nm to about 900nm, examples of suitable free radical photoinitiators include: camphorquinone, 4,4'- bis(diethylamino) benzophenone (Chivacure EMK from Chitec), 4,4'-bis(N,N'-dimethylamino) benzophenone (Michler's ketone), bis(2,4,6-trimethylbenzoyl) -phenylphosphineoxide ("BAPO," or Irgacure 819 from Ciba), metallocenes such as bis(eta 5-2-4-cyclopentadien-1-yl) bis[2,6-difluoro-3-(1H-pyrrol-1-yl) phenyl] titanium (Irgacure 784 from Ciba), and the visible light photoinitiators from Spectra Group Limited, Inc. such as H-Nu 470, H-Nu-535, H-Nu-635, H-Nu-Blue-640, and H-Nu-Blue-660.

In one embodiment of the instant claimed invention, the light emitted by the radiation source is UVA radiation, which is radiation with a wavelength between about 320 and about 400 nm. In one embodiment of the instant claimed invention, the light emitted by the radiation source is UVB radiation, which is radiation with a wavelength between about 280 and about 320 nm. In one embodiment of the instant claimed invention, the light emitted by the radiation source is UVC radiation, which is radiation with a wavelength between about 100 and about 280 nm.

The liquid thermoset material can include any suitable amount of the free-radical photoinitiator, for example, in certain embodiments, in an amount, relative to the weight of the entire liquid thermoset composition being jetted, up to about 10 wt. %, or from about 0.1 to about 10 wt. %, or from 0.5 to about 6 wt. %, or from about 1 wt. % to about 3 wt. %. Of course, if the initiators are jetted separately from the polymerizable compounds, the weight percentage of the free-radical photoinitiator in the reservoir or jetting head into which initiators are contained can be much higher, and even up to 100 wt. %.

In an embodiment, the liquid thermoset material comprises a cationic photoinitiator.

The cationic photoinitiator initiates cationic ring-opening polymerization upon irradiation of light. In an embodiment, any suitable onium salt-based cationic photoinitiator may be used, although iodonium-based cationic photoinitiators are preferred, for example, those with cations selected from the group consisting of diaryl iodonium salts, triaryl iodonium salts, aromatic iodonium salts, and any combination thereof.

In another embodiment, the cation of the cationic photoinitiator is selected from the group consisting of aromatic diazonium salts, aromatic sulfonium salts, aromatic iodonium salts, metallocene based compounds, aromatic phosphonium salts, and any combination thereof. In another embodiment, the cation is a polymeric sulfonium salt, such as in U.S. Pat. Nos. 5,380,923 or 5,047,568, or other aromatic heteroatom-containing cations and naphthyl-sulfonium salts such as in U.S. Pat. Nos. 7,611,817, 7,230,122, US2011/0039205, US2009/0182172, U.S. Pat. No. 7,678, 528, EP2308865, WO2010046240, or EP2218715. In another embodiment, the cationic photoinitiator is selected from the group consisting of triarylsulfonium salts, diaryliodoniuin salts, and metallocene based compounds, and any combination thereof. Onium salts, e.g., iodonium salts and sulfonium salts, and ferrocenium salts, have the advantage that they are generally more thermally stable.

In a particular embodiment, the cationic photoinitiator has an anion selected from the group consisting of $BF_4^-$, $AsF_6^-$, $SbF_6^-$, $PF_6^-$, $[B(CF_3)_4]^-$, $B(C_6F_5)_4^-$, $B[C_6H_3\text{-}3,5(CF_3)_2]_4^-$, $B(C_6H_4CF_3)_4^-$, $B(C_6H_3F_2)_4^-$, $B[C_6F_4\text{-}4(CF_3)]_4^-$, $Ga(C_6F_5)_4^-$, $[(C_6F_5)_3B\text{—}C_3H_3N_2\text{—}B(C_6F_5)_3]^-$, $[(C_6F_5)_3B\text{—}NH_2\text{—}B(C_6F_5)_3]^-$, tetrakis(3,5-difluoro-4-alkyloxyphenyl)borate, tetrakis(2,3,5,6-tetrafluoro-4-alkyloxyphenyl)borate, perfluoroalkylsulfonates, tris[(perfluoroalkyl)sulfonyl]methides, bis[(perfluoroalkyl)sulfonyl]imides, perfluoroalkylphosphates, tris(perfluoroalkyl)trifluorophosphates, bis(perfluoroalkyl)tetrafluorophosphates, tris(pentafluoroethyl)trifluorophosphates, and $(CH_6B_{11}Br_6)$—, $(CH_6B_{11}Cl_6)$— and other halogenated carborane anions.

In an embodiment, the cationic photoinitiator has a cation selected from the group consisting of aromatic sulfonium salts, aromatic iodonium salts, and metallocene based compounds with at least an anion selected from the group consisting of $SbF_6^-$, $PF_6^-$, $B(C_6F_5)_4^-$, $[B(CF_3)_4]^-$, tetrakis (3,5-difluoro-4-methoxyphenyl)borate, perfluoroalkylsulfonates, perfluoroalkylphosphates, tris[(perfluoroalkyl)sulfonyl]methides, and $[(C_2F_5)_3PF_3]^-$.

Examples of cationic photoinitiators suitable in other embodiments include 4-[4-(3-chlorobenzoyl)phenylthio]phenyl bis(4-fluorophenyl)sulfonium hexafluoroantimonate, 4-[4-(3-chlorobenzoyl)phenylthio]phenyl bis(4-fluorophenyl)sulfonium tetrakis(pentafluorophenyl)borate, 4-[4-(3-chlorobenzoyl)phenylthio]phenyl bis(4-fluorophenyl)sulfonium tetrakis(3,5-difluoro-4-methyloxyphenyl)borate, 4-[4-(3-chlorobenzoyl)phenylthio]phenyl bis(4-fluorophenyl)sulfonium tetrakis(2,3,5,6-tetrafluoro-4-methyloxyphenyl)borate, tris(4-(4-acetylphenyl)thiophenyl)sulfonium tetrakis(pentafluorophenyl)borate (Irgacure® PAG 290 from BASF), tris(4-(4-acetylphenyl)thiophenyl)sulfonium tris[(trifluoromethyl)sulfonyl]methide (Irgacure® GSID 26-1 from BASF), tris(4-(4-acetylphenyl)thiophenyl)sulfonium hexafluorophosphate (Irgacure® 270 from BASF), and HS-1 available from San-Apro Ltd.

In a preferred embodiment, the cationic photoinitiator component includes, either alone or in a mixture: bis[4-diphenylsulfoniumphenyl]sulfide bishexafluoroantimonate; thiophenoxyphenylsulfonium hexafluoroantimonate (available as Chivacure 1176 from Chitec), tris(4-(4-acetylphenyl)thiophenyl)sulfonium tetrakis(pentafluorophenyl)borate (Irgacure® PAG 290 from BASF), tris(4-(4-acetylphenyl)thiophenyl)sulfonium tris[(trifluoromethyl)sulfonyl]methide (Irgacure® GSID 26-1 from BASF), and tris(4-(4-acetylphenyl)thiophenyl)sulfonium hexafluorophosphate (Irgacure® 270 from BASF), [4-(1-methylethyl)phenyl](4-methylphenyl) iodonium tetrakis(pentafluorophenyl)borate (available as Bluesil PI 2074 from Bluestar Silicones), 4-[4-(2-chlorobenzoyl)phenylthio]phenyl bis(4-fluorophenyl)sulfonium hexafluoroantimonate (as SP-172 from Adeka), SP-300 from Adeka, and aromatic sulfonium salts with anions of $(PF_{6-m}(C_nF_{2n+1})_m)^-$ where in is an integer from 1 to 5, and n is an integer from 1 to 4 (available as CPI-200K or CPI-200S, which are monovalent sulfonium salts from San-Apro Ltd., TK-1 available from San-Apro Ltd., or HS-1 available from San-Apro Ltd.).

In an embodiment of the invention, the liquid radiation curable resin for additive fabrication comprises an aromatic triaryl sulfonium salt cationic photoinitiator. Use of aromatic triaryl sulfonium salts in additive fabrication applications is known. Please see US 20120251841 to DSM IP Assets, B.V., U.S. Pat. No. 6,368,769, to Asahi Denki Kogyo, which discusses aromatic triaryl sulfonium salts with tetraryl borate anions, including tetrakis(pentafluorophenyl)borate, and use of the compounds in stereolithography applications. Triarylsulfonium salts are disclosed in, for example, J Photopolymer Science & Tech (2000), 13(1), 117-118 and J Poly Science, Part A (2008), 46(11), 3820-29. Triarylsulfonium salts $Ar_3S^+MXn^-$ with complex metal halide anions such as $BF_4^-$, $AsF_6^-$, $PF_6^-$, and $SbF_6^-$, are disclosed in J Polymer Sci, Part A (1996), 34(16), 3231-3253.

An example of a triaryl sulfonium tetrakis(pentafluorophenyl)borate cationic photoinitiator is tris(4-(4-acetylphenyl)thiophenyl)sulfonium tetrakis(pentafluorophenyl)borate. Tris(4-(4-acetylphenyl)thiophenyl)sulfonium tetrakis(pentafluorophenyl)borate is known commercially as IRGACURE® PAG-290, and is available from Ciba/BASF.

In another embodiment, the cationic photoinitiator is an aromatic triaryl sulfonium salt that possesses an anion represented by $SbF_6^-$, $PF_6^-$, $BF_4^-$, $(CF_3CF_2)_3PF_3^-$, $(C_6F_5)_4B^-$, $((CF_3)_2C_6H_3)_4B^-$, $(C_6F_5)_4Ga^-$, ((CF$_3$)$_2$C$_6$H$_3$)$_4$Ga$^-$, trifluoromethanesulfonate, nonafluorobutanesulfonate, methanesulfonate, butanesulfonate, benzenesulfonate, or p-toluenesulfonate. Such photoinitiators are described in, for example, U.S. Pat. No. 8,617,787.

Another cationic photoinitiator is an aromatic triaryl sulfonium cationic photoinitiator that possesses an anion that is a fluoroalkyl-substituted fluorophosphate. Commercial examples of an aromatic triaryl sulfonium cationic photoinitiator having a fluoroalkyl-substituted fluorophosphate anion is the CPI-200 series (for example CPI-200K® or CPI-210S®) or 300 series, available from San-Apro Limited.

There are also several commercially available cationic photoinitiators which are designed to be especially suitable for absorbing light and generating photoreactive species at UV/vis wavelengths. Incorporation of one or more of these cationic photoinitiators into a liquid radiation curable composition for UV/vis cure would be achieved through "direct" excitation of the photoinitiator. Some non-limiting examples of UV/vis-direct excitation cationic photoinitiators include: Irgacure 261, Irgacure PAG 103, and Irgacure PAG 121, each of which is available commercially from BASF, R-Gen® 262 (η 5-2,4-cyclopentadien-1-yl)[(1,2,3,4,5,6-η)-(1-methylethyl)benzene]-iron(I)-hexafluoroantimonate), which is available commercially from Chitec Technology Co., and the CPI-400 series photoinitiators, which are available from San-Apro Limited.

The liquid thermoset material can include any suitable amount of the cationic photoinitiator, for example, in certain embodiments, in an amount, relative to the weight of the entire liquid thermoset material being jetted, up to about 15 wt. %, or up to about 5 wt. %, and in further embodiments from about 2 wt. % to about 10 wt. % or from about 0.1 wt. % to about 5 wt. %, or from about 0.2 wt. % to about 4 wt. %, or from about 0.5 wt. % to about 3 wt. %. Of course, if the initiators are jetted separately from the polymerizable compounds, the weight percentage of the cationic photoinitiator in the reservoir or jetting head into which initiators are contained can be much higher, and even up to 100 wt. %.

The liquid thermoset material may optionally include one or more additives. Additives any desired components that are desired to be added to the material and do not fall under any of the categories listed above. Possible additives include stabilizers, organic and inorganic fillers, dyes, pigments, antioxidants, wetting agents, bubble breakers, chain transfer agents, leveling agents, defoamers, surfactants, and the like. Such additives are known and can be generally employed as is desirable for a particular application, as will be appreciated by one of ordinary skill in the art.

Stabilizers are often added to the resin compositions as additives in order to further prevent a viscosity build-up, for instance a viscosity build-up during usage in a solid imaging process. Useful stabilizers include those described in U.S. Pat. No. 5,665,792. The presence of a stabilizer is optional. In a specific embodiment, the liquid thermoset material comprises from 0.1 wt. % to 3 wt. % of a stabilizer. In another embodiment, the liquid thermoset material is substantially free from a stabilizer.

Fillers include those described in U.S. Pat. No. 9,228,073, which is hereby incorporated by reference in its entirety. In an embodiment, the liquid thermoset material contains a filler component. In an embodiment, the filler component comprises a plurality of silica particles. In an embodiment, the silica particles further comprise a plurality of microparticles and a plurality of nanoparticles. In yet a further embodiment, the filler component comprises a plurality of microparticles possessing an average particle size, as measured by ISO 3320:2009, of from greater than 5 microns to about 50 microns, or from greater than 5 microns to about 25 microns, or from about 10 microns to about 25 microns, or from 15 microns to about 20 microns.

If utilized, the fillers may be present in an amount, relative to the weight of the entire liquid thermoset material into which they are incorporated, from about 10 wt. % to about 65 wt. %, or about 20 wt. % to about 60 wt. %, or from about 30 wt. % to about 50 wt. %, or form about 35 wt. % to about 50 wt. %.

The liquid radiation curable resin composition for additive fabrication of the invention can further include one or more additives selected from the group consisting of bubble breakers, antioxidants, surfactants, acid scavengers, pigments, dyes, thickeners, flame retardants, silane coupling agents, ultraviolet absorbers, resin particles, impact modifiers, soluble polymers and block copolymers, and combinations thereof.

Impact modifiers include those described in U.S. Pat. No. 9,676,899, which is hereby incorporated by reference in its entirety. In an embodiment the liquid thermoset material contains an impact modifier. In an embodiment, the impact modifier comprises a block copolymer. In an embodiment, the impact modifier comprises a plurality of elastomeric core-shell particles. If utilized, the impact modifier may be present in an amount, relative to the weight of the entire liquid thermoset material into which they are incorporated, from about 3 wt. % to about 40 wt. %, or from about 4 wt. % to about 30 wt. %, or from about 5 wt. % to about 20 wt. %.

Additionally, many known thermosets utilize hydroxy-functional compounds to enhance the properties of the parts made therefrom. If present, any hydroxy group may be employed for the particular purpose. If present, the hydroxyl-containing material preferably contains one or more primary or secondary aliphatic hydroxyl. The hydroxyl group may be internal in the molecule or terminal. Monomers, oligomers or polymers can be used. The hydroxyl equivalent weight, i.e., the number average molecular weight divided by the number of hydroxyl groups, is preferably in the range of 31 to 5000. If present, the liquid thermoset material preferably comprises, relative to the total weight of the entire material, at most 10 wt. % of one or more non-free radical polymerizable hydroxy-functional compounds, or at most 5 wt. %, or at most 2 wt. %.

In an embodiment, the liquid thermoset material comprises a TPA-based polyester. The TPA-based polyester comprises a backbone and a number average of at least 2 polymerizable groups per molecule. The backbone comprises the reaction product of a terephthalic acid (TPA) and a polyol.

The backbone comprises a polyester formed from the polycondensation product of terephthalic acid and a polyol. A polyol is an alcohol having two or more hydroxyl groups. In an embodiment, the polyol is a diol, a triol, or a tetraol. In an embodiment, the polyol is a pentaol or higher order polyol. In an embodiment, the polyol is a diol. The TPA-based polyester may comprise just a single type of polyol and TPA; it may also comprise more than one type of polyol, such as two, three, four, five, or six different polyols, and TPA. In an embodiment the TPA-based polyester is linear. In an embodiment, the TPA-based polyester is branched or dendritic.

In an embodiment, the polyol is an aliphatic or cycloaliphatic polyol. In an embodiment, the polyol is an aromatic polyol. In an embodiment, the polyol has at least 2, at least 3, at least 4, at least 5, or at least 6 hydroxyl groups. In an embodiment, the polyol has at most 2, at most 3, at most 4, at most 5, at most 6, at most 8, or at most 10 hydroxyl groups. In an embodiment, the polyol is linear. In an embodiment, the polyol is branched.

The polyol is selected such that the glass transition temperature ($T_g$) of the TPA-based polyester is 40° C. or more. In an embodiment, the TPA-based polyester has a $T_g$ of at least 40° C., at least 45° C., at least 50° C., at least 55° C., at least 60° C., at least 65° C., or at least 70° C. In an embodiment, the $T_g$ of the TPA-based polyester is 150° C. or less, 125° C. or less, or 120° C. or less.

In an embodiment, the polyol comprises a polyalkylene polyol or a polyalkylene oxide polyol. In an embodiment, the polyol comprises a polyethylene glycol, a polypropylene glycol, a polytetramethylene oxide (PTMO) polyol, a random or block polypropylene oxide-polyethylene oxide copolymer polyol, a random or block polytetramethylene oxide-polyethylene oxide copolymer polyol, a polycarbonate polyol, a hydroxyl-terminated silicone, a hydroxyalkyl-terminated silicone, a random or block silicone-polyethyleneoxide copolymer polyol, a polybutadiene polyol, a polyisobutylene polyol, a polybutylene oxide polyol, or a mixture thereof.

In an embodiment, the polyol comprises 1,4-butanediol, 1,2-propylene glycol, 1,3-propylene glycol, dipropylene glycol, tripropylene glycol, ethylene glycol, diethylene glycol, triethylene glycol, trimethylene glycol, tetramethylene glycol, pentamethylene glycol, hexamethylene glycol, octametnylene glycol, decamethylene glycol, neopentyl glycol, 1,6-hexanediol, hydrogenated bisphenol-A, ethoxylated bisphenol A, propoxylated bisphenol A, glycerol, 1,2,6-hexanetriol, 1,1,1-tris(hydroxymethyl)propane, pentane-1,2,3-triol, propane-1,1,1-triol, 1,2-cyclohexanediol, 1,4-cyclohexanediol, 1,1-cyclohexanedimethylol, cyclohexane-1,2,4-triol, cyclopropane-1,2,3-triol, benzenetriol, pentane-1,1,5,5-tetraol, hexane-1,2,5,6-tetraol, 1,2,4,5-tetrahydroxybenzene, butane-1,2,3,4-tetraol, [1,1'-biphenyl]-3,3',5,5'-tetraol, trimethylolpropane, pentaerythritol, 1,4-cyclohexane dimethanol, phenyldiethanolamine, or a mixture thereof.

In an embodiment, the TPA-based polyester comprises a further polyacid other than TPA. In an embodiment, the further polyacid is an aliphatic polyacid or an aromatic polyacid. In an embodiment, the further polyacid comprises a dicarboxylic acid represented by the general formula HOOC—Z—COOH wherein Z is aliphatic compound contains at least 2 carbon atoms. Such dicarboxylic acids include adipic acid, sebacic acid, phthalic acid, isophthalic acid, octadecanedioic acid, pimelic acid, suberic acid, azelaic acid, brassilic acid, dodecanedioic acid, glutaric acid, maleic acid, fumaric acid, 6-naphthalenedicarboxylic acid, 4,4'-oxybisbenzoic acid, 3,6-dichlorophthalic acid, tetrachlorophthalic acid, tetrahydrophthalic acid, hexahydroterephthalic acid, hexachloroendomethylenetetrahydrophthalic acid, endomethylenetetrahydrophthalic acid, decanedicarboxylic acid, succinic acid, and trimellitic acid. In an embodiment, the further polyacid comprises phthalic acid or isophthalic acid.

In an embodiment, at least 20 mol %, or at least 50 mol %, or at least 70 mol %, or least 90 mol %, or at least 98 mol %, or 100 mol % of the backbone of the TPA-based polyester comprises the reaction product of a polyacid and a polyol.

The TPA-based polyester is preferably functionalized or reacted with reactive groups that participate in the polymerization reaction. In an embodiment, the TPA-based polyester comprises polymerizable groups that comprise an acrylate, methacrylate, epoxy, oxetane, hydroxyl, itaconate, vinyl ether, allyl ether, maleate, or fumarate. In an embodiment, the polymerizable groups comprise acrylate, methacrylate, epoxy, oxetane, or itaconate. In an embodiment the polymerizable groups comprise acrylate, methacrylate, epoxy, or oxetane. In an embodiment, the polymerizable groups comprise acrylate or methacrylate. In an embodiment, the polymerizable groups comprise methacrylate. The polymerizable groups can be formed by, for example, reacting a hydroxyl functional monomer comprising the desired polymerizable group with a carboxylic acid functional polymer comprising a TPA/polyol backbone. If the TPA-based polyester is functionalized with free-radical functional groups, it would be counted as part of the first network-forming component. If the TPA-based polyester is functionalized with cationically polymerizable functional groups, it would be counted as part of the second network-forming component.

In an embodiment, the polymerizable groups comprise endgroups. An endgroup is a group present at the terminus of a polymer. In an embodiment, the polymerizable groups are endgroups and there are no polymerizable groups that are not endgroups in the TPA-based polyester.

In an embodiment, the TPA-based polyester comprises a number average of 2.0, at least 2.1, at least 2.2, at least 2.3, at least 2.4, at least 2.5, at least 2.6, or at least 2.7 polymerizable groups per molecule. In an embodiment, the TPA-based polyester comprises a number average of at most 10, at most 9, at most 8, at most 7, at most 6, at most 5, at most 4.5, at most 4, at most 3.5, or at most 3 polymerizable groups per molecule. In an embodiment, the TPA-based polyester comprises from 2.3-3 polymerizable groups. Generally, as the functionality of the TPA-based polyester increases, the amount of the TPA-based polyester in the composition may decrease.

In an embodiment, the TPA-based polyester has a number average molecular weight of at least 800 g/mol, at least 900 g/mol, at least 1000 g/mol, at least 1100 g/mol, at least 1200 g/mol, at least 1300 g/mol, at least 1400 g/mol, or at least 1500 g/mol. In an embodiment, the TPA-based polyester has a number average molecular weight of at most 10,000 g/mol, at most 9,000 g/mol, at most 8,000 g/mol, at most 7000 g/mol, at most 6,000 g/mol, at most 5,000 g/mol, at most 4,000 g/mol, or at most 3,000 g/mol.

In an embodiment, the TPA-based polyester has a number average of from 2 to 3 endgroups, and the amount, number average molecular weight, and number average of endgroups of the TPA-based polyester in the composition satisfies the above equation, and f is the number average of endgroups of the TPA-based polyester.

It is possible that the TPA-based polyester achieves a number average of from 2 to 3 polymerizable groups per molecule by a blend of TPA-based polyesters having different functionalities. For example, using 70 mol % of a TPA-based polyester having a number average of 2.3 polymerizable groups per molecule and 30 mol % of a TPA-based polyester having a number average of 4.0 polymerizable groups per molecule, is considered a TPA-based polyester having a number average of 2.8 polymerizable groups per molecule. In this example, fin the above equation would be 2.8 and $M_{polyester}$ is calculated based on the mol % of each TPA-based polyester.

In an embodiment, the TPA-based polyester is present in an amount of at least 5 wt. %, at least 10 wt. %, at least 15 wt. %, at least 19.95 wt. %, at least 20 wt. %, at least 25 wt. %, at least 30 wt. %, at least 40 wt. %, at least 50 wt. %, at least 60 wt. %, at least 70 wt. %, or at least 80 wt. %, based on the total weight of the composition. In an embodiment, the TPA-based polyester is present in an amount of at most 80 wt. %, at most 78 wt. %, at most 75 wt. %, at most 70 wt. %, at most 60 wt. %, at most 50 wt. %, at most 40 wt. %, at most 30 wt. %, or at most 20 wt. %, based on the total weight of the composition.

In an embodiment, the TPA-based polyester is present in an amount of at least 5 wt. %, at least 10 wt. %, at least 15 wt. %, at least 19.95 wt. %, at least 20 wt. %, at least 25 wt. %, at least 30 wt. %, at least 40 wt. %, at least 50 wt. %, at least 60 wt. %, at least 70 wt. %, or at least 80 wt. %, based on the total weight of the composition excluding any solvent. In an embodiment, the TPA-based polyester is present in an amount of at most 80 wt. %, at most 78 wt. %, at most 75 wt. %, at most 70 wt. %, at most 60 wt. %, at most 50 wt. %, at most 40 wt. %, at most 30 wt. %, or at most 20 wt. %, based on the total weight of the composition excluding any solvent.

In an embodiment, the TPA-based polyester is present in an amount of 19.95 wt. %, at least 20 wt. %, at least 25 wt. %, at least 30 wt. %, at least 40 wt. %, at least 50 wt. %, at least 60 wt. %, at least 70 wt. %, or at least 80 wt. %, based on the total weight of the first network-forming component. In an embodiment, the TPA-based polyester is present in an amount of at most 80 wt. %, at most 78 wt. %, at most 75 wt. %, at most 70 wt. %, at most 60 wt. %, at most 50 wt. %, at most 40 wt. %, at most 30 wt. %, or at most 20 wt. %, based on the total weight of the first network-forming component.

In an embodiment, the TPA-based polyester is amorphous. In an embodiment, the TPA-based polyester comprises a blend of amorphous and semi-crystalline TPA-based polyesters. In an embodiment, the TPA-based polyester comprises a blend of amorphous, semi-crystalline, and crystalline TPA-based polyesters.

In an embodiment, the print system is configured such that the jetting head ejects the liquid thermoset material through the nozzle at an elevated operating temperature. In another embodiment, the print system is configured such that the jetting head ejects the liquid thermoset material through the nozzle at an elevated viscosity. In a preferred embodiment, the print system is configured such that the jetting head simultaneously ejects the liquid thermoset material through the nozzle at an elevated temperature and an elevated viscosity.

To be compatible with the print systems used in the methods of the current invention, the liquid thermoset material may be selected or formulated according to known methods and/or as described above herein. Such a liquid thermoset material chosen to be used in practicing the methods according to the invention described herein is highly viscous, for example at 25 degrees Celsius when compared to ink compositions known to be used in traditional material jetting processes. In an embodiment, therefore, the viscosity of the liquid thermoset material or materials selected possesses, at 25 degrees Celsius, a viscosity of at least 20 centipoise (cPs), or at least 30 cPs, or at least 40 cPs, or at least 50 cPs, or at least 60 cPs, or at least 70 cPs, or at least 80 cPs, or at least 90 cPs, or at least 100 cPs, or at least 150 cPs, or at least 200 cPs, or at least 250 cPs, or at least 300 cPs, or at least 350 cPs, or at least 400 cPs, or at least 450 cPs, or at least 500 cPs, or at least 550 cPs, or at least 600 cPs, or at least 650 cPs, or at least 700 cPs, or at least 750 cPs, or at least 800 cPs, or at least 850 cPs, or at least 900 cPs, or at least 950 cPs, or at least 1000 cPs, or at least 1100 cPs, or at least 1200 cPs, or at least 1300 cPs. In an embodiment, the liquid thermoset material selected possesses, at 25 degrees Celsius, a viscosity of less than 2000 cPs, or less than 1500 cPs, or less than 1400 cPs, or less than 1300 cPs, or less than 1200 cPs, or less than 1100 cPs, or less than 1000 cPs, or less than 900 cPs, or less than 800 cPs, or less than 700 cPs, or less than 600 cPs, or less than 500 cPs, or less than 400 cPs, or less than 300 cPs, or less than 200 cPs.

In an alternative embodiment, the liquid thermoset material or materials chosen possess, at 25 degrees Celsius, a viscosity from about 100 cPs to about 3000 cPs, or from about 150 cPs to about 2500 cPs, or from about 250 cPs to about 2250 cPs, or from greater than 500 cPs to about 2000 cPs, or from about 650 cPs to about 1750 cPs, or from about 750 cPs to about 1500 cPs.

It has been determined that many liquid thermosets capable of imparting desirable physical properties into the solid parts formed therefrom possess are highly viscous, as indicated by, e.g., an elevated viscosity at around room temperature. It naturally follows that many such liquid thermoset materials suitable for use in the processes of the current invention similarly possess an elevated viscosity at the temperature at which the jetting head of the print system into which they are incorporated operates. This surprisingly includes viscosities at the so-called operating temperature that are higher than any materials used according to known methods for material jetting for additive fabrication applications.

However, in order to be suitable for use in the methods of various embodiments of the present invention, such highly viscous liquid thermoset materials must still be sufficiently flowable at the operating temperature of the jetting head. Therefore, in an embodiment, the viscosity of the liquid thermoset material at the operating temperature is up to 60 cPs, or up to 55 cPs, or up to 50 cPs, or up to 45 cPs, or up to 40 cPs, or up to 35 cPs, or up to 30 cPs, or up to 25 cPs, or up to 20 cPs. In an alternative embodiment, the viscosity of the liquid thermoset material at the operating temperature is from about 2 cPs to about 60 cPs, or from about 5 cPs to 55 about cPs, or from about 8 cPs to about 50 cPs, or from about 10 cPs to about 50 cPs, or from greater than 20 cPs to about 60 cPs, or from greater than 30 cPs to about 60 cPs.

In view of the foregoing, it is noted that a particularly viscous liquid thermoset material's viscosity sensitivity as a result of temperature change may play an important role in determining whether that viscous material is suitable for use according to the processes described herein. That is, all else being equal, a liquid thermoset material that exhibits a relative high level of viscosity reduction with increases in temperature would be more desirable, because it follows that such a highly viscous resin would be more likely to be sufficiently flowable at a given elevated operating temperature than a material without such thermal sensitivity. It follows, therefore, that in an embodiment, the liquid thermoset material chosen or formulated for use in a print system according to methods of the invention should, if its relative viscosity were plotted as a function of temperature, exhibit a relatively large viscosity ratio. As used herein, viscosity ratio is a measure of the viscosity of the material at 25° C. divided by that same material's viscosity 100° C.

In an embodiment, therefore, the viscosity ratio of the liquid thermoset material is greater than 15, or greater than 20, or greater than 30, or greater than 50, or greater than 60, or greater than 100. In another embodiment, the viscosity ratio of the liquid thermoset is less than 1000, or less than 800, or less than 500, or less than 300, or less than 200. If the viscosity ratio becomes too high, the resin may be unstable and therefore unusable in jetting processes. In an alternative embodiment, therefore, the viscosity ratio of the liquid thermoset material is from 15-1000, or from 20-800, or from 30-500, or from 50-500, or from 60-500, or from 100-500 or from 100-300, or from 60-300, or from 60-200, or from 100-200.

In addition to the aforementioned so-called "static" viscosity characteristics, Inventors have also determined that a liquid thermoset material used in the methods according to the present invention should possess certain rheological characteristics as well. This is true at least in part due to the well-known fact that jetting processes for additive fabrication, such as the jetting processes of the current invention, are optimized if the materials used therewith break up into droplets upon ejection. Inventors have discovered that highly viscous liquid thermoset materials are not suitable for use in material jetting processes according to the current invention if their elongational flow behavior, or elongational viscosity, suggests a significant amount of elasticity. This is true even if they are of an appropriate viscosity (both at 25 degrees Celsius and at the elevated operating temperature) according to embodiments of the present invention. This is true because such materials will either not form droplets, will form them inconsistently, or will form so-called satellite droplets, resulting in an unintended or inconsistent deposition of additional material.

Inventors have determined that an understanding of the elongational flow behavior of a liquid thermoset material is important in predicting its suitability in the processing conditions required by the material jetting processes for additive fabrication of the present invention. A good proxy for determining elongational flow behavior is an analysis of the material's capillary break up. Break up can be delayed for materials which exhibit visco-elastic behavior.

Capillary break up, which is determined by the elongational flow behavior and elastic tendencies of a material, is measured via capillary break-up extensional rheometry (CaBER). CaBER techniques require loading of a liquid sample between the circular surfaces of two opposing rods or cylinders. Samples are loaded in such a way that the space between the surfaces is fully filled. The surfaces (the end of cylindrical rods) are then separated from each other and the sample is stretched. The deformation—and especially the thinning—of the sample after the rods are separated is then followed using high speed video monitoring equipment.

Figure 3:
FIG. 3 shows a time-lapse depiction of a material being subjected to a CaBER extensional rheology test.

The diameter reduction of the unitary filament or strand of material may then be determined via an analysis of the recorded video. The thinnest diameter of the liquid pillar is measured during evaluation of the recorded video. An actual depiction of a strand of an arbitrary material being subjected to a CaBER test is depicted in FIG. 3. FIG. 3 shows the geometry of the strand of material being tested at 10 different points in time chronologically as the rods are moved apart. It can be observed in FIG. 3 that the strand finally breaks apart and becomes discontinuous (i.e. the break-up time). This minimum diameter is plotted as a function of time to aid in the analysis of the tested material.

Inventors have discovered that the physics underlying CaBER methods, i.e. surface tension dominated thinning of a filament of a polymer solution, provides an ideal proxy for that encountered by liquid thermoset materials being ejected from the nozzle of a print head in material jetting applications for additive fabrication.

CaBER tests enable for the quantitative assessment of a given material in multiple manners. One such quantitative manner relies upon a comparison between the actual break-up time and a theoretical viscous break-up time (which represents an estimation of the break-up time in the absence of elastic effects in the material). The viscous break-up time is determined by fitting a straight line in the graph of minimum diameter versus time in the diameter range from 0.25 to 0.75 mm. The time at which the diameter of the line formed would intersect the x-axis is called the viscous break-up time. The greater the gap between the actual break-up time and the viscous break-up time, the less likely the material will be sufficiently inelastic to be incorporated in jetting processes of the current invention. One expression for determining this gap is Eq. 1:

$$\frac{t_{break} - t_{viscous}}{t_{viscous}} < X$$

wherein $t_{break}$ is the actual break-up time and $t_{viscous}$ is the viscous break-up time. In an embodiment, therefore, the liquid thermoset material or materials selected or formulated for use in the material jetting process of the current invention, possesses an actual break-up time and viscous break-up time such that, when extended and tested according to a CaBER method at 23±2 degrees Celsius, the result of Eq. 1 is less than 1, or less than 0.8, or less than 0.7, preferably less than 0.5, or less than 0.4, or less than 0.3, or less than 0.2, or less than 0.1, or about 0.0.

If the actual break-up time is too large, especially relative to the viscous break-up time, the material will prove to be too elastic for appropriate use in material jetting methods according to the current invention. The relatively large elastic stress inside the jet will inhibit droplet separation from the nozzle and the total jet will be drawn back into the resin reservoir thus rendering the process unable to reliably create three-dimensional objects from such thermoset materials.

Another CaBER-related quantitative result with which to predict a material's suitability for jetting in processes of the current invention is by determining its relaxation time according to the Entov & Hinch elongational elastic behavior model. In such a method, one relaxation time λ is determined in the interval between the viscous break-up time and 90% of the actual break-up time using Eq. 2:

$$\frac{D(t)}{D_0} \approx \left(\frac{\eta_p \cdot D_0}{4\lambda\gamma}\right)^{1/3} \times e^{-t/3\lambda}$$

wherein:
$D_0$ is the initial measured diameter (m) of a strand at time $t_{viscous}$,
$\eta_p$ is the zero-shear viscosity of the material (Pa·s),
γ is the surface tension of the material (N/m) and
λ is the relaxation time (s), wherein
the combination $$"\left(\frac{\eta_p \cdot D_0}{4\lambda\gamma}\right)^{1/3}"$$

is a fitting parameter.

In an embodiment, therefore, the liquid thermoset material or materials selected or formulated for use in the material jetting process of the current invention, possesses a CaBER profile such that, when extended and tested according to a CaBER method at 23±2 degrees Celsius, the relaxation time derived from Eq. 2 is less than 100 milliseconds (ms), or less than 75 ms, or less than 50 ms, preferably less than 25 ms, or less than 15 ms, or less than 10 ms. In an embodiment, the relaxation time is from 0.01 ins to about 25 ms, or from 0.05 ms to about 20 ms, or from 0.1 ms to about 15 ms.

A second embodiment is a three-dimensional article formed by the method of any of the aspects of the first embodiment. The three-dimensional article may be formed from any of the liquid thermoset materials according to the current invention via any of the methods described herein.

The three-dimensional articles formed by the material jetting methods of the current invention should possess superior mechanical properties. In an embodiment, the three-dimensional article formed by the material jetting method of the current invention possesses substantially the same properties for a given liquid thermoset material than such a material if utilized in alternative additive manufacturing processes, such as stereolithography. In an embodiment, a component for a given geometry made from a specified liquid thermoset material in a method according to the present invention possesses an elastic modulus value within 80%, more preferably within 85%, more preferably within 90%, more preferably within 95%, or within 99% of a component made from the same liquid thermoset material of the same geometry via a stereolithography process.

Some potential applications of articles disclosed herein include as molded articles, shoe soles, eyeglasses, three-dimensional objects formed by additive fabrication processes, coatings for optical fibers, medical devices or coatings on medical devices, other coatings, and paints.

The following examples further illustrate the invention but, of course, should not be construed as in any way limiting its scope.

EXAMPLES

These examples illustrate liquid thermoset materials used in embodiments of the methods of the instant invention. Table 1 describes the various components of the liquid thermoset materials used in the present examples. Table 2 lists the compositions of the present examples. Experimental results are shown in Table 3 and Table 4.

TABLE 1

Raw Materials

| Component | Chemical Descriptor | Supplier/ Manufacturer |
|---|---|---|
| NeXt | 5-25% toughening agent, 21-55% multifunctional acrylate, 20-50% cationically curable monomer, 10.1-21% epoxy, 1-5% cationic photoinitiator, 1-5% free-radical photoinitiator, 1-5% additive | Somos* (DSM) |
| NeXt matrix | 21-55% multifunctional acrylate, 20-50% cationically curable monomer, 10.1-21% epoxy, 1-5% cationic photoinitiator, 1-5% free-radical photoinitiator, 1-5% additive | Custom |
| Evolve 128 | 21-55% multifunctional acrylate, 20-50% cationically curable monomer, 10.1-21% epoxy, 1-5% cationic photoinitiator, 1-5% free-radical photoinitiator, 1-5% additive | Somos* |
| PLASTCure Rigid 10500 | 25-50% silica particles, 15-35% epoxy, 2.1-11% multifunctional acrylate, 1-5% cationically curable monomer, 1-5% cationic photoinitiator, 1-5% free-radical photoinitiator | Prodways |
| Epoxy 1075 | Poly(Bisphenol A-co-epichlorohydrin, glycidyl end-capped Average $M_n \sim 1{,}075$ | Aldrich |
| AGI-TP16006 | AGI-TP16006 | DSM AGI |
| Bisomer HPMA | Bisomer* HPMA | GEO Specialty Chemicals, Inc. |
| Genomer G4247 | GENOMER* 4247 | RAHN |
| Irgacure 819 | Phosphine oxide, phenyl bis 2,4,6-trimethyl benzoyl) (BAPO) | BASF |
| Epon 1750 | Poly(Bisphenol A-co-epichlorohydrin) $M_n \sim 1{,}750$, reacted with methacrylic acid | See synthesis, below |
| HEMA | 2-hydroxyethyl methacrylate | Aldrich |
| Toluquinon | p-Toluquinone | Aldrich |
| Polyester methacrylate | $M_n = 1500$, Functionality of 2.6 | See synthesis, below |
| THFMA | Tetrahydrofurfuryl methacrylate | Aldrich |
| PE-IPDI-HEMA | Mn = 1200, Functionality of 2.6 | See synthesis, below |
| BenzylMA | BenzylMethacrylate | Aldrich |
| RL1-53B | silicone urethane acrylate | Siltech |
| AB 111933 | Methacryloxypropyl-methylsiloxane-dimethylsiloxane copolymer | ABCR |
| Silica Particles | Nanopox A610: 40% spherical silica nanoparticles in 60% 3,4-epoxycyclohexylmethyl 3',4'-epoxycyclohexanecarboxylate; 20 nm avg. particle size | Evonik Industries |

Examples 1-12

Various liquid thermoset compositions were prepared by combining one or more of the raw materials described above in Table 1 according to well-known methods in the art.

Synthesis of Epon 1750 Vinyl Ester Resin

Epon 1750 vinylester resin was prepared by providing a 1-liter jacketed reactor vessel equipped with a stirrer, condenser, dosing point and an aeration needle. The aeration needle was filled with Bisphenol A epoxy resin ($M_n$: 1792 g/mol) and toluene. The vessel was heated up until the mixture reached 100° C. after which methyl hydroquinone was added together with first 5 ml of methacrylic acid to acidify the mixture. After this, triphenylphosphine was added and the Lauda temperature was increased to 130° C., thereby causing the toluene to reflux. Upon reflux of toluene, the remaining methacrylic acid was added within 15 minutes. The reaction mixture was left stirring overnight at 130° C. After 10 hours of reaction, a sample was taken to check the acid and epoxy value. 3 ml of additional methacrylic acid was added and the reaction was continued for another two hours at reflux before lowering the Lauda temperature to 110° C. The condenser was exchanged for a distillation condenser equipped with collection flask. Hydroxyethyl methacrylate (HEMA) was then added and toluene was removed at 110° C. using the flow of the aeration needle over the course of two hours. The temperature inside the condenser reached 60-70° C. After two hours, the temperature was quickly (i.e. after approximately 20 minutes) increased to 135° C. before stopping the reaction. At the end, 0.2 g of trimethylhydroquinone was added and the product was then transferred into standard aluminum cans for storage. The reaction composition described below in Table 1.1 as follows:

TABLE 1.1

| Material | Amount [gram] | Amount [mmole] |
|---|---|---|
| Bisphenol A epoxy resin ($M_n$:1792 g/mol) | 500.5 | 279.3 |
| Methacrylic acid | 48.1 | 558.6 |
| Triphenylphosphine | 0.855 | 2.5 |
| Methylhythoquinone | 0.314 | 3.3 |
| Trimethylhydroquinone | 0.2 | 1.3 |
| Toluene | 348 | 3777 |
| HEMA | 400 | 3074 |

To create the final composition for Example 6 herein, 191 g of the above resin was mixed with 62 g of HEMA, 0.955 g toluquinone, and 5.18 g of BAPO.

Synthesis of "Polyester Methacrylate"

The polyester methacrylate referred to herein was prepared by first providing a reactor vessel fitted with a thermometer, a stirrer and a distillation device for the removal of water formed during the synthesis. Said reactor vessel was then filled with a tin catalyst, 1,2-propanediol, and trimethylopropane. The vessel was heated up until the mixture reached 110° C. after which terephthalic acid was added and under a nitrogen flow. The temperature was gradually increased to 245° C. while distilling of the reaction water until the acid number of the precursor of the polyester was below 20 mg KOH/g and the hydroxyl value was measured. If needed the reaction mixture was corrected with 1,2-propanediol (15-20 mg KOH/g above the desired hydroxyl value) at 200° C. and heated for another hour at 245° C. before proceeding to the vacuum step. At 200° C., reduced pressure was applied until the polyester reached an acid value below 5 mg KOH/g and the desired hydroxyl value. To further reduce the acid value, ethylenecarbonate was added at 190° C., and the amount was based on reducing the measured acid value to zero. Next, the temperature was maintained at 200° C. for one hour, after which a vacuum was applied for 15 minutes and the mixture was then discharged onto an aluminum foil kept at room temperature.

TABLE 1.3

In a similar fashion all polyester below are synthesized.

| Sample code | OH [mg KOH/g] | AV [mg KOH/g] | $M_n$ (g/mol) (theoretical) | functionality | $T_g$ [° C.] |
|---|---|---|---|---|---|
| NBK-003245-096 | 108.4 | 2.8 | 1320 | 2.7 | 46.5 |
| NBK-003245-124 | 120.5 | 3.9 | 1217 | 2.7 | 37.3 |

The sample above was then functionalized with methacryloyl chloride to yield a methacrylate-functional TPA-based polyester by performing the following method NBK-003245-096 (300 g, 220 mmol) was weighed in a 2000 ml 3-neck RB flask. After weighing, the RB flask was fitted with a thermometer, Stirrer and $N_2$ inlet.

$CH_2Cl_2$ (anhydrous) (750 ml) was added in measuring flask and added into the flask, after which the oligomer was left to dissolve at room temperature. The flask was next cooled with ice water to control the exothermic reaction.

Once the oligomer had completely dissolved, triethylamine (129 ml, 927 mmol) was added to the reaction mixture, followed by a drop-wise addition of methacryloyl chloride (85 ml, 869 mmol). During the addition, an exotherm of 20° C. was observed. The reaction was then analyzed after 2 hours of stirring. (MH-01245-102RM1). The analysis, which involved proton nuclear magnetic resonance spectroscopy (H-NMR), was difficult to interpret in order to conclude if the reaction had completed. Therefore, triethylamine (17.60 gram) and methacryloylchloride (15.01 gram) were added to drive the reaction to completion. The reaction was then stirred (50 rpm) overnight at room temperature. The flask in which the reaction was contained was further UV-protected by means of a cover made from aluminum foil.

The next day, the reaction mixture was filtered over a filter to remove the formed salt. The buchner flask and funnel were then washed with (2 times 50 ml) dichloromethane. Subsequently the mixture was precipitated in one (5 l) Schott-bottle by the addition of increasing amounts of methanol at room temperature, with the step-wise observations listed below:

Methanol (500 ml) was added→Clear solution (exotherm 30° C. was observed)
Methanol (100 ml) was added→Emulsion formed
Methanol (400 ml) was added→Emulsion formed
Methanol (1000 ml) was added→Polymer started to precipitate
Methanol (1000 ml) was added→Polymer precipitated as an oil; no problems with mixing
Methanol (1000 ml) was added→Polymer precipitated against the wall; no problems with mixing.
Methanol (500 ml) was added→No further precipitation was observed.

To ensure that no more methanol was required, 3 ml of supernatant was taken, whereupon 9 ml of methanol was then added to investigate if more polymer precipitated out of the solution. Because no precipitation was observed at even this scale, no additional methanol was added.

Next, the precipitate was left for 1 hour in the flask, during which stirring occurred. The supernatant was then removed by decantation and the precipitate was washed two times with methanol (two times 300 ml) by shaking the flask. The methanol was removed by allowing for a drying process for 1 hour under reduced pressure in an oven at room temperature.

After the drying had completed, THF (BHT stabilized, 600 ml) was next added to dissolve the polymer overnight at room temperature. Again, the Schott bottle was covered with aluminum foil to protect the polymer solution from light and stored in the vinifire to dissolve. A clear polymer-solution was obtained after dissolving overnight. H-NMR showed no clear differences with MH-01245-084, and no further filtration was carried out because no solids were observed.

The final steps involved removal of the solvent (THF) rotavapor, after which the material was poured into one Teflon tray. The remaining THF was removed in an oven set to 40° C. with a max vacuum setting for 2 hours, after which the polymer was dried 3 hours at 45° C. to remove residual solvent and any remaining triethylamine. The total yield was 261 grams.

H-NMR and GPC analysis of the final product was then determined (MH-01245-102 Final product).

To create the final composition for Example 10 as used herein, the functionalized sample based upon NBK-003245-96 as described above in a UV-protected vial supplied with a screw cap was mixed with 40 wt. % THF-methacrylate. The entire mixture was then stirred and heated at 80° C. in order to facilitate dissolution. Once the mixture became homogeneous, Irgacure 819 was added (2% of total mass) and allowed to dissolve.

Synthesis of "PE-IPDI-HEMA"

The PE-IPDI-HEMA referred to herein was prepared by reacting a polyester (sample NBK-003245-124 shown above) with isophorone diisocyanate and hydroxy ethyl methacrylate in benzyl methacrylate. This reaction was performed as follows: Into a glass reactor equipped with lean air, 979.5 g isophorone diisocyanate (1,463 mol), 3 g butylated hydroxy toluene (500 ppm), 1200 g benzyl methacrylate and 3 g dibutyl tin dilaurate were added and allowed to mix for 5 minutes. Over a timeframe of 3 hours, 573.5 g hydroxy ethyl methacrylate was added whilst cooling the reactor. After 1 hour, 1200 g benzyl methacrylate and 3 g dibutyl tin dilaurate were added and allowed to mix for 10 minutes. Then, 2038.0 g TPA-polyester (NBK-003245-124) was added and the mixture was heated to 85° C. The reaction continued over approximately 16 hours at 85° C. Subsequently, the reactor was discharged over a 125 micron filter. The resulting material was a 60/40 mixture of polyester urethane methacrylate in benzyl methacrylate (NBK-003068-110).

To create the final composition for Example 7 below, the above resin was further diluted with benzyl methacrylate until the composition contained 55 parts per weight of the PE-IPDI-HEMA and 45 parts per weight of benzyl methacrylate. Finally, 2 parts per weight of Irgacure 819 was added and was allowed to dissolve.

TABLE 2.1

Compositions of Examples 1-12
All amounts are listed in parts per weight

| Sample | 1 | 2 | 3 | 4 | 5 | 6 | 7 | 8 | 9 | 10 | 11 | 12 |
|---|---|---|---|---|---|---|---|---|---|---|---|---|
| NeXt | | | | | | | | 25 | 100 | | | |
| NeXt Matrix | 100 | | | 80 | | | | 75 | | | | |
| Evolve | | 100 | | | | | | | | | | |
| PLASTCure Rigid 10500 | | | 100 | | | | | | | | | |
| Epoxy 1075 | | | | 20 | | | | | | | | |
| AGI-TP16006 | | | | | 50 | | | | | | | |
| Bisomer HPMA | | | | | 30.5 | | | | | | | |
| Genomer G4247 | | | | | 17 | | | | | | | |
| Irgacure 819 | | | | | 2.5 | 2 | 2 | | | 2 | | |
| Epon 1750 | | | | | | 40 | | | | | | |
| HEMA | | | | | | 60 | | | | | | |
| Toluquinon | | | | | | 0.4 | | | | | | |
| Polyester methacrylate | | | | | | | | | | 60 | | |
| THFMA | | | | | | | | | | 40 | | |
| PE-IPDI-HEMA | | | | | | | 55 | | | | | |
| BenzylMA | | | | | | | 45 | | | | | |
| RL1-53B | | | | | | | | | | | 100 | |
| AB 111933 | | | | | | | | | | | | 100 |
| TOTALS | 100 | 100 | 100 | 100 | 100 | 102.4 | 102 | 100 | 100 | 102 | 100 | 100 |

Examples 13-18

Various liquid thermoset compositions were prepared by combining one or more of the raw materials described above in Table 1 according to well-known methods in the art.

TABLE 2.2

All amounts are listed in weight %

| Sample | 13 | 14 | 15 | 16 | 17 | 18 |
|---|---|---|---|---|---|---|
| PLASTCure Rigid 10500 | 100 | 80 | 70 | 60 | 50 | 40 |
| Silica Particles | 0 | 20 | 30 | 40 | 50 | 60 |

Test Methodology—Jet Temperature, Viscosity, and Jettability

One or more of the compositions described above were incorporated into a Vista printhead array, available from the Technology Partnership plc, Melbourn, England. The compositions were jetted at various temperatures, with droplets ejected from each composition at each temperature tested captured by a camera. The minimum temperature at which maximum jettability performance was observed was recorded in Table 3 below.

The viscosity at the jetting temperature was then recorded in the table. These values were not independently tested during the jetting process, but instead were recorded as the viscosity at the temperature at which jetting occurred based on the methodology described in the Viscosity Ratio section below.

Jettability performance was rated qualitatively as "Good," "Fair," and "Poor." A "Good" rating was given if all droplets tested ejected with a minimum number of satellite droplets formed. In the event a small percentage of satellite droplets were indeed formed, they did not possess tails and in any event did not land back on and cause puddling onto the nozzle plate. A "Fair" rating was given if the material exhibited many successful jetting events with a high percentage of droplet ejection. For this rating, some satellite droplets could be formed, a minority of which landed back on the nozzle plate, thereby forming slight puddling. Finally, a "Poor" rating was given, meanwhile, if the rate of droplet ejection was low, there was a significant amount of puddling around the nozzle, or many droplets were pulled back into the nozzle.

Viscosity Ratio

A large number of viscosity measurements were taken for relevant compositions at varying temperatures. The measurements, which are reflective of steady-shear temperature ramp tests, were performed on an Anton Paar MCR501 rheometer, equipped with a C-PTD200 Peltier temperature control device. Measurements were performed using either a DG26.7 (Double Gap) or a CC27 (Concentric Cylinder) geometry. A sample cup was covered with a lid attached to the shaft of the DG26.7 or CC27 geometry. Sufficient amounts of each sample were loaded into the applied sample cups. In case of using the DG26.7 geometry in combination with a relative high viscous resin, it was necessary to pre-heat the geometry to a temperature of ~80° C. so that the cup could be filled properly. In all other cases, the sample was loaded into the geometry at room temperature. Next, the temperature of the system was set to 20° C. and the system was given the time to equilibrate (~15 minutes) to the start temperature of 20° C.

The measurement consists of steady shear temperature ramp test from 20 to 150/160° C. applying a heating rate of 5° C. $\text{min}^{-1}$ and a steady shear rate of 10 $\text{s}^{-1}$ and a measuring point duration of 5 seconds. If necessary, an additional steady shear temperature ramp test back from 150/160° C. to 20° C. with a cooling rate of 5° C. $\text{min}^{-1}$ can be performed to check for (un)stability during the heating ramp. The viscosity values (Pa·s) were plotted as function of temperature (° C.), and the value of the viscosity at 25° C. divided by the value of the viscosity at 100° C. for the same sample was calculated and reported in Table 3 below as the "Viscosity Ratio."

CaBER Test

For the CaBER test herein, a Haake™ CaBER 1 capillary breakup extensional rheometer was used. The CaBER instrument used possessed two opposed vertically aligned and parallel circular surfaces between which a sample was disposed. For the present test, the instrument incorporated opposing and substantially collinear cylindrical rods, with the circular face of each rod being used as the surface upon which the samples were placed. The surfaces were made of steel and possessed a roughness (Ra) of less than 0.2 µm. A drop of each sample material was placed between the surfaces (each having a diameter of 4 mm±0.25 mm), which were initially spaced 2±0.05 mm apart.

With the surfaces situated in the horizontal plane, the top surface was moved vertically by means of an actuator upward to extend the sample. The surfaces were prevented from rotating or vibrating. The upper surface was then moved upward to increase the distance between the surfaces from 2 mm (for loading the sample) to 6 mm±0.25 mm linearly within 50 ms. The movement was conducted so as to ensure the surfaces did not have an overshoot of more than 5% with respect to the total displacement of the top plate. Further, the angle of the translational axis of the top surface with the normal of the bottom surface should be less than 2°.

The CaBER instrument used was further equipped with a high-speed video camera and an appropriate light source as described further below, in accordance with the schematic depicted in FIG. 6.

Figure 6:
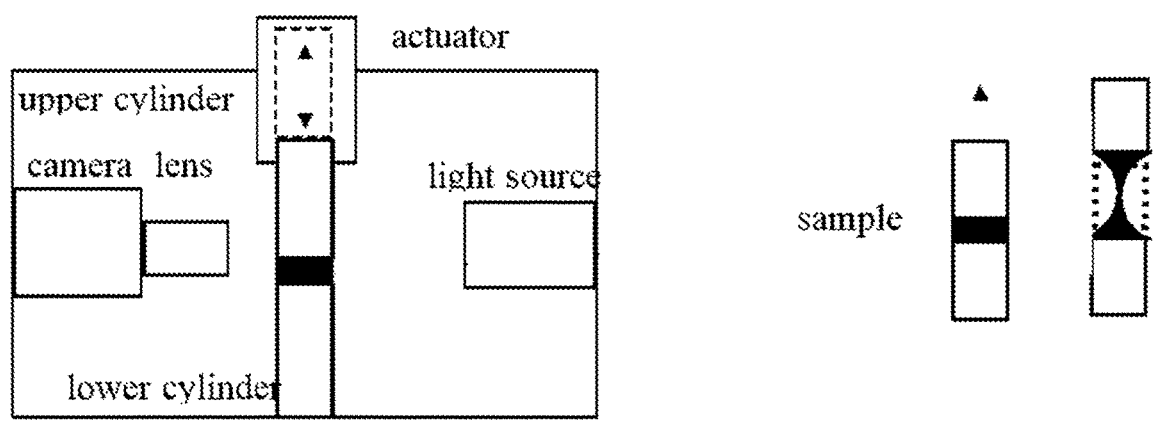
FIG. 6 depicts a schematic for a high-speed video camera and an appropriate light source as used herein.

As depicted schematically in FIG. 6, the sample was disposed between a light source and the high-speed video camera on the opposite side. The light source homogeneously illuminated the sample area during the entire course of separation/extension of the surfaces. The camera used herein was a IDT NR-4-S3 high speed camera (1024×1024 pixels), IDT LED's, which can be pulsed by the NR-4-S3 to get maximum light conditions at opening of the aperture. Also used was the VZM450 lens with 0.7-4.5× magnification (available from Edmond optics). The system resolution used was 2.9 µm/pixel. The resolution of the camera in the object plane should be less than 5 µm/pixel; a zoom lens can be used to obtain the needed resolution. In any event, the camera should be focused at the middle of the sample.

The instrument and video setup were operated by a skilled operator such that the frame rate and shutter times were adjusted to have optimal sharp frames. The video recording was started no later than the time of the beginning of the rod movement/separation. The maximal frame rate should be at least 3000 fps, although for longer breakup-times the frame rate can be reduced. At minimum, the number of frames needed for sufficient data analysis should be around 200-300.

The filament of the sample after stretching was maintained as clearly visible in the video recording so that image analysis software could determine the edge of the filament as to allow the determination of the shape of the filament in the whole frame. The minimum width of the filaments was determined by taking several factors into account. First, edge detection settings were set so the found edge of the filament clearly follows the shape of the filament. Next, the skilled user verified the result of the edge detection for artifacts with respect to detected edge versus image. Also, image enhancement was used to enhance the contrast between filament and background by doing, for instance, a subtraction of the background frame. Finally, pixel interpolation was also used to determine the edge position more accurately. The minimum width measurable with the video setup should be preferably 6 micrometers but at least smaller than 10 micrometers.

The measurements were taken at standard lab conditions: room temperature (23±2° C. and a relative humidity of 40-60%). In order to minimize vaporization of a component of the material under investigation, the measurements were started within 20 seconds after loading the sample in the CaBER instrument.

The actual measurement started after the movement of the upper cylinder stopped and surface tensions started thinning the sample. For normalization and increased reproducibility, the time during evaluation was set to when the width of the filament was 1.6 mm. The video recording continued until either break-up or for at least 10 seconds. If no breakup occurred for the duration of the video, the material was automatically considered to be not jettable. The actual break-up time ($t_{break}$) was found by first fitting a straight line in the minimum width/diameter versus time curve (in the region between 0.1 and 0.01 mm), and then extrapolating this curve fit to a width equal to zero. The extrapolated width at zero equals the actual break-up time.

Figure 4:
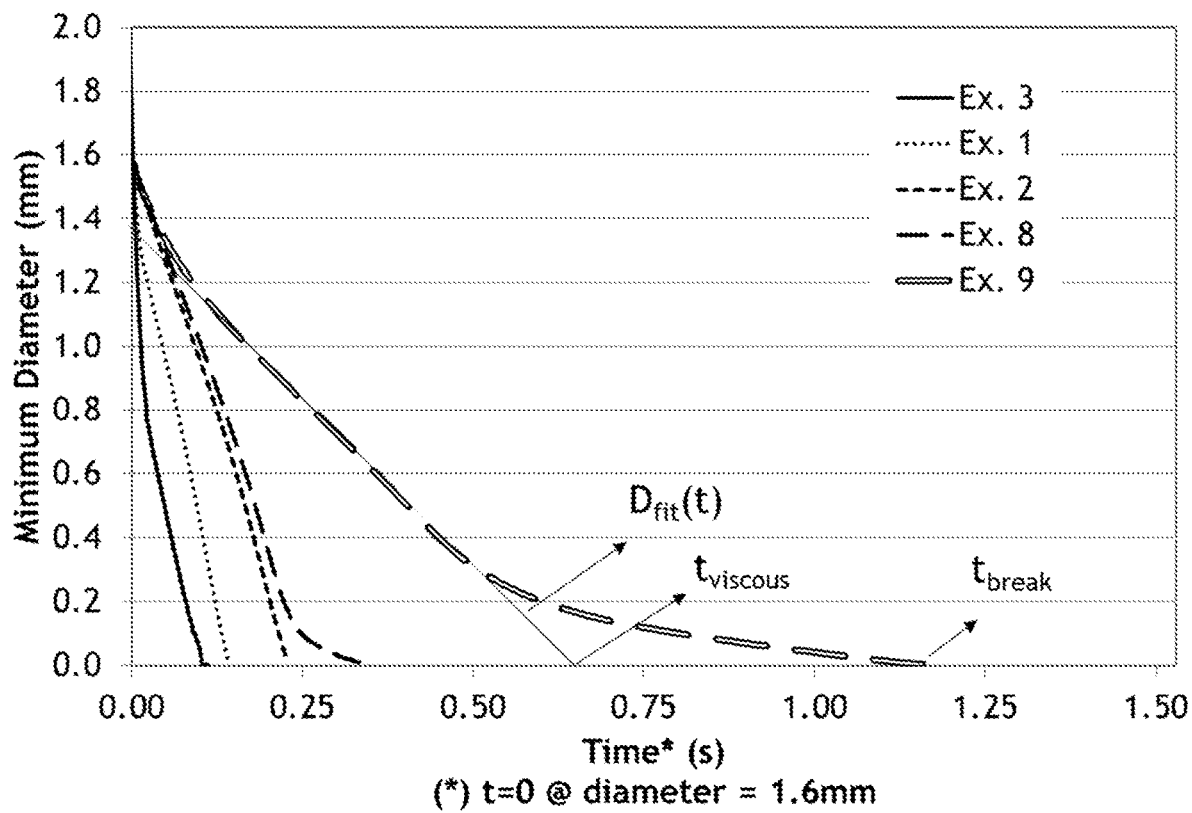
FIG. 4 is a plot of the diameter of several different materials as a function of time in accordance with a CaBER extensional rheology test. The actual and viscous break up time for at least one material is depicted in the plot.

Using the set-up and technique described elsewhere herein, plots of the measured minimum diameter as a function of time for various examples (Ex. 1, 2, 3, 8, and 9) are depicted in FIG. 4. FIG. 4 also depicts the hypothetical line that, upon its intersection with the x-axis, enables the identification of the hypothetical viscous break-up time.

Utilizing the experimental data, values for Eq. 1 (described further elsewhere herein, supra) for each sample were calculated, in accordance with the following:

$$\frac{t_{break} - t_{viscous}}{t_{viscous}} < X \quad (\text{Eq. 1})$$

In a similar manner, the relaxation time value was extracted from Eq. 2 (described further elsewhere herein, supra) in accordance with the following:

$$\frac{D(t)}{D_0} \approx \left(\frac{\eta_p \cdot D_0}{4\lambda\gamma}\right)^{1/3} \times e^{-t/3\lambda} \quad (\text{Eq. 2})$$

Figure 5:
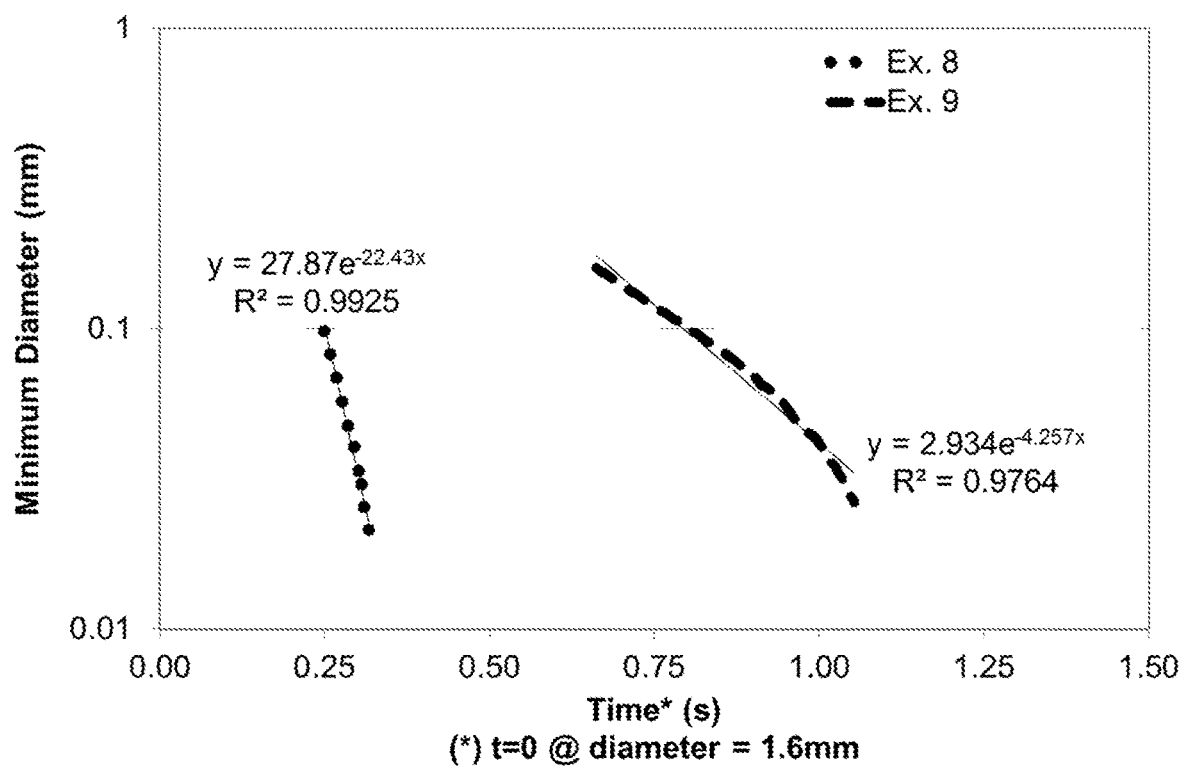
FIG. 5 is a plot of data points usable for fitting Eq. 2, described elsewhere herein.

The points usable for fitting Eq. 2 relative to examples 8 and 9 are plotted in FIG. 5. If no points are found in the interval between the viscous break-up time and 90% of the actual break-up time, the relaxation time is considered to be negligible, and only the condition related to Eq. 1 is followed.

In case Eq. 1 is larger than 0.1 the second conditions for Eq. 2 have to be met also.

The calculated relaxion time for each sample was then recorded and is provided herein in Table 3 below.

TABLE 3

Viscosity and temperature sensitivity of various liquid thermoset materials.

| Example | Visco at Jet Temp (° C.) | jetting temp. (mPas) | Jett-ability | CaBER Test $\frac{t_{break} - t_{viscous}}{t_{viscous}}$ | Relaxation time (ms) | Viscosity Ratio (25° C./100° C.) |
|---|---|---|---|---|---|---|
| 1 | 70 | 38 | Good | 0.01 | <1 | 61.84 |
| 2 | 70 | 46 | Good | 0.00 | <1 | 60.99 |
| 3 | 80 | 55 | Good | 0.05 | 1.3 | 18.99 |
| 4 | 110 | 36 | Good | n/a | n/a | 175.82 |
| 5 | 110 | 20 | Good | 0.08 | <1 | 92.54 |
| 6 | 135 | 18 | Good | 0.01 | <1 | 60.25 |
| 7 | 140 | 25 | Good | 0.05 | <1 | 88.31 |
| 8 | 130 | 8 | Fair | 0.40 | 14.9 | 61.76 |
| 9 | 140 | 20 | Poor | 0.78 | 78.3 | 52.91 |
| 10 | 150 | 50 | n/a | n/a | n/a | n/a |
| 11 | 150 | 720 | n/a | n/a | n/a | 28.91 |
| 12 | 150 | 120 | Poor | n/a | n/a | 3.86 |
| 13 | 80 | n/a | Good | n/a | n/a | n/a |
| 14 | 120 | n/a | Fair | 0.021 | <1 | n/a |
| 15 | n/a | n/a | Poor | −0.008 | <1 | n/a |
| 16 | n/a | n/a | Poor | −0.001 | <1 | n/a |
| 17 | n/a | n/a | n/a | 0.028 | <1 | n/a |
| 18 | n/a | n/a | n/a | 0.029 | <1 | n/a |

Test Methodology—SLA vs. Vista Jetting of Example 2

Cured "dog bones" were constructed according to the "Type 3" geometry specified in ISO37:2011 (with an overall length of 50 mm, an overall width of 8.5 mm, and a thickness of approximately 2 mm) from the composition of Example 2 on two different additive fabrication processes. The first process was via stereolithography on a Viper SLA Machine (manufacturer 3D Systems; SIN 03FB0244 or 02FB0160) according to method well known to those of skill in the art to which this invention applies. The second method was on TTP Vista Jet multi array system (manufacturer TTP).

After products created from the composition via each additive manufacturing technique were created, certain mechanical properties of each were evaluated. The cured products created via each method were evaluated via a tensile method. Various properties such as elastic modulus, sigma-max, sigma-break, epsilon-sigma max, and epsilon sigma % were observed and have been recorded in Table 4 below. Elastic modulus, Sigma-max, and sigma break were all measured per ISO 37:2011 and ISO 527 (1 mm/min), where appropriate, with the results recorded below in Table 4.

TABLE 4

Physical Property testing of three-dimensional articles created via different additive fabrication methods utilizing liquid thermoset materials

| Example | Print Method | Elastic Modulus (MPa) | Sigma-max | Sigma-break | Epsilon-Sigma max | Epsilon-sigma % |
|---|---|---|---|---|---|---|
| 2 | SLA | 2500 | 50 | 36 | 3.0 | 9.2 |
| 2 | Vista jetting | 2060 | 44 | 35 | 3.0 | 6.7 |

Discussion of Results

As can be seen from the above tables, when liquid thermoset materials possessing certain viscosity and rheological requirements are used in a system according to methods of the current invention, it is possible to print high viscosity liquid thermosets that via jet printing methods that produce three-dimensional articles yielding excellent mechanical properties.

Unless otherwise specified, the term wt. % means the amount by mass of a particular constituent relative to the entire liquid radiation curable composition for additive fabrication into which it is incorporated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While the invention has been described in detail and with reference to specific embodiments thereof, it will be apparent to one of ordinary skill in the art that various changes and modifications can be made therein without departing from the spirit and scope of the claimed invention.

The invention claimed is:

1. A method for forming a three-dimensional object, the method comprising:
   selectively depositing a liquid thermoset material onto a surface from a nozzle of at least one jetting head of a print system in a first jetting direction in accordance with a predetermined pattern;
   exposing at least a portion of the liquid thermoset material to a source of actinic radiation to form a portion of a cured thermoset material; and
   repeating the selectively depositing and exposing steps a plurality of times in order to form a three-dimensional object from the cured thermoset material;
   wherein the jetting head is configured to eject droplets of the liquid thermoset material from the nozzle at an operating temperature of up to about 180° C.;
   wherein the liquid thermoset material possesses, at the operating temperature, a viscosity of up to about 60 cPs; and
   wherein the liquid thermoset material, when tested by a CaBER extensional rheology method, satisfies the following equation:

$$\frac{t_{break} - t_{viscous}}{t_{viscous}} < X$$

wherein $t_{break}$ is the actual break-up time and $t_{viscous}$ is the viscous break-up time, and X is less than 0.4.

2. A method for forming a three-dimensional object, the method comprising:
   selectively depositing a liquid thermoset material onto a surface from a nozzle of at least one jetting head of a print system in a first jetting direction in accordance with a predetermined pattern;
   exposing at least a portion of the liquid thermoset material to a source of actinic radiation to form a portion of a cured thermoset material; and
   repeating the selectively depositing and exposing steps a plurality of times in order to form a three-dimensional object from the cured thermoset material;
   wherein the jetting head is configured to eject droplets of the liquid thermoset material from the nozzle at an operating temperature from about 40° C. to about 150° C.;
   wherein the liquid thermoset material possesses, at the operating temperature, a viscosity from greater than 30 cPs to about 60 cPs; and wherein the liquid thermoset material possesses a maximum relaxation time of less than 25 milliseconds when tested by a CaBER extensional rheology method in accordance with the following equation:

$$\frac{D(t)}{D_0} \approx \left(\frac{\eta_p \cdot D_0}{4\lambda\gamma}\right)^{1/3} \times e^{-t/3\lambda}.$$

3. The method for forming a three-dimensional object of claim 1, wherein
the jetting head comprises
at least one nozzle plate with an aperture forming the nozzle;
and at least one piezo-electric transducer operably connected to the nozzle plate, wherein said piezo-electric transducer is excitable to move the nozzle plate in a direction substantially parallel or antiparallel to the first jetting direction, thereby causing an ejection of at least one droplet of the liquid thermoset material from the nozzle; and
wherein the liquid thermoset material possesses, at 25° C., a viscosity from about 150 cPs to about 2500 cPs.

4. The method for forming a three-dimensional object of claim 1, wherein the liquid thermoset material possesses a viscosity ratio from 15 to 200 wherein the viscosity ratio is the ratio of the liquid thermoset material's viscosity at 25° C. divided by its viscosity at 100° C.

5. The method for forming a three-dimensional object of claim 4, wherein the liquid thermoset material comprises a first network-forming component with at least one free-radically polymerizable compound;
a second network-forming component with at least one cationically polymerizable compound;
a free-radical photoinitiator, at least one cationic photoinitiator, and optionally, one or more additives.

6. The method for forming a three-dimensional object of claim 5, wherein
the free-radical photoinitiator is present from 0.1 wt. % to 8 wt. %;
the cationic photoinitiator is present from 0.1 wt. % to 15 wt. %;
the first network-forming component and the second network-forming component is each present from about 5 wt. % to about 80 wt. %, or from 5 wt. % to 40 wt. %;
the one or more additives are present from 0 wt. % to 60 wt. %;
wherein all weight percentages are listed relative to the weight of the entire composition, and the weights of the respective components do not exceed 100 wt. %.

7. The method for forming a three-dimensional object of claim 6, wherein the first network-forming component comprises a multifunctional acrylate monomer; and the second network-forming component comprises a compound with an epoxy-functional group and/or an oxetane-functional group.

8. The method for forming a three-dimensional object of claim 6, wherein the one or more additives comprise a plurality of silica microparticles and a plurality of silica nanoparticles; wherein the plurality of microparticles possess an average particle size, as measured by ISO 13320:2009, from greater than 5 microns to about 25 microns.

9. The method for forming a three-dimensional object of claim 8, wherein the liquid thermoset material comprises filler in an amount, relative to the weight of the entire liquid thermoset material, from about 20 wt. % to about 60 wt. %.

10. The method for forming a three-dimensional object of claim 6, wherein the one or more additives comprise an impact modifier;
wherein the impact modifier comprises a plurality elastomeric core-shell particles, wherein the core-shell particles comprise a block copolymer.

11. The method for forming a three-dimensional object of claim 10, wherein the impact modifier is present in an amount, relative to the weight of the entire liquid thermoset material, from about 3 wt. % to about 40 wt. %.

12. The method for forming a three-dimensional object of claim 6, wherein the liquid thermoset material comprises a terephthalic acid-based polyester comprising at least two polymerizable groups.

13. The method for forming a three-dimensional object of claim 3, wherein the print system further comprises at least one reservoir in fluid connection with the jetting head for storing a portion of the liquid thermoset material;
and a heating element operably connected to a temperature controller, wherein the heating element is controlled to heat the liquid thermoset material in the reservoir.

14. The method for forming a three-dimensional object of claim 13, wherein the print system comprises an array of jetting heads configured to provide a flow-through construction, wherein each jetting head possesses at least one nozzle.

15. The method for forming a three-dimensional object of claim 14, wherein the array is configured to provide fluid communication between successive jetting heads and/or between successive nozzles;
the array of jetting heads is rigidly fastened; and successive nozzles are separated by a baffle.

16. The method for forming a three-dimensional object of claim 3, wherein a means for selectively exciting transducers as required is provided, thereby to project liquid as droplets from the respective outer face by movement of the liquid through the nozzle in response to the movement of the nozzle.

17. The method for forming a three-dimensional object of claim 16, wherein one or more pressure absorbing regions are disposed at a predetermined distance from said nozzles, in a direction perpendicular to the substantially planar array of transducers.

18. The method for forming a three-dimensional object of claim 17, wherein the source of actinic radiation comprises a plurality of light emitting diodes (LEDs), a laser, or a broadband lamp.

19. The three-dimensional article formed by the method of claim 1.

20. The method of claim 2, wherein the liquid thermoset material comprises, relative to the weight of the entire of the liquid thermoset material:
from 5 wt. % to 80 wt. % of a first network-forming component with at least one free-radically polymerizable compound;
from 5 wt. % to 80 wt. % of a second network-forming component with at least one cationically polymerizable compound;
from 0.1 wt. % to 8 wt. % of a free-radical photoinitiator;
from 0.1 wt. % to 15 wt. % of a cationic photoinitiator;
and from 0 wt. % to 60 wt. % of one or more additives.

* * * * *